(12) United States Patent
Palmer

(10) Patent No.: US 8,453,992 B2
(45) Date of Patent: Jun. 4, 2013

(54) PILOT OPERATED WATER VALVE

(75) Inventor: Andrew J. Palmer, Tauranga (NZ)

(73) Assignee: Robertshaw Controls Company, Carol Stream, IL (US)

( * ) Notice: Subject to any disclaimer, the term of this patent is extended or adjusted under 35 U.S.C. 154(b) by 1196 days.

(21) Appl. No.: 12/343,672

(22) Filed: Dec. 24, 2008

(65) Prior Publication Data

US 2010/0155636 A1 Jun. 24, 2010

(51) Int. Cl.
*F16K 31/12* (2006.01)

(52) U.S. Cl.
USPC .............. 251/30.05; 251/30.01; 251/129.16

(58) Field of Classification Search
USPC ............. 251/30.01, 30.02, 129.16, 129.15, 251/65, 30.05, 234, 233, 25
See application file for complete search history.

(56) References Cited

U.S. PATENT DOCUMENTS

| | | | | |
|---|---|---|---|---|
| 2,160,117 A | * | 5/1939 | Borresen | 251/129.03 |
| 2,215,954 A | * | 9/1940 | Borresen | 236/68 R |
| 2,228,588 A | * | 1/1941 | Ray | 431/281 |
| 2,398,452 A | * | 4/1946 | Shaw | 137/636.1 |
| 2,430,107 A | | 11/1947 | Cronrath | |
| 2,549,188 A | * | 4/1951 | Forsnas | 251/30.02 |
| 2,956,770 A | * | 10/1960 | Galley | 251/30.02 |
| 3,090,592 A | * | 5/1963 | Fleer | 251/30.05 |
| 3,263,693 A | * | 8/1966 | Ages | 137/15.01 |
| 3,410,301 A | * | 11/1968 | Merriner et al. | 137/269 |
| 3,603,559 A | * | 9/1971 | Totten | 251/129.2 |
| 4,170,339 A | * | 10/1979 | Ueda et al. | 251/129.2 |
| 4,268,009 A | * | 5/1981 | Allen, Jr. | 251/129.2 |
| 4,418,886 A | * | 12/1983 | Holzer | 251/30.05 |
| 4,446,889 A | * | 5/1984 | Sakakibara et al. | 137/625.4 |
| 4,635,494 A | | 1/1987 | Conklin | |
| 4,889,314 A | * | 12/1989 | Hashizume et al. | 251/129.02 |
| 4,958,774 A | * | 9/1990 | Taylor | 239/585.3 |
| 5,040,567 A | * | 8/1991 | Nestler et al. | 137/625.44 |
| 5,090,441 A | * | 2/1992 | Richmond | 137/242 |
| 5,140,876 A | | 8/1992 | Fields | |
| 5,145,145 A | | 9/1992 | Pick et al. | |
| 5,403,230 A | | 4/1995 | Capriglione, Sr. | |
| 5,674,002 A | | 10/1997 | Powell et al. | |
| 5,709,370 A | * | 1/1998 | Kah, Jr. | 251/129.15 |
| 5,762,097 A | * | 6/1998 | Hettinger et al. | 137/270 |
| 5,921,009 A | | 7/1999 | Hice | |
| 5,954,311 A | * | 9/1999 | Thorpe | 251/30.03 |

(Continued)

FOREIGN PATENT DOCUMENTS

CN  1153876 A  7/1997
JP  11-294619 A  10/1999

(Continued)

*Primary Examiner* — John K Fristoe, Jr.
*Assistant Examiner* — Andrew J Rost
(74) *Attorney, Agent, or Firm* — Reinhart Boerner Van Deuren P.C.

(57) ABSTRACT

A solenoid operated pilot valve utilizes an offset pilot opening and a lever arm to provide a mechanical advantage to multiply the opening force of the solenoid, thereby allowing the solenoid size to be reduced. The lever arm used to position the pilot valving member is mechanically positioned via a solenoid driven plunger in one embodiment, and is positioned by magnetic force alone in an alternative, plungerless embodiment. The lever arm pivots via a fixed fulcrum point, a profiled fulcrum providing continuously variable mechanical advantage, or a stepped fulcrum providing discreet different mechanical advantages as the pilot valving member is moved from its fully closed to its fully opened position.

32 Claims, 19 Drawing Sheets

U.S. PATENT DOCUMENTS

| | | | |
|---|---|---|---|
| 6,014,917 A | 1/2000 | Bally et al. | |
| 6,178,855 B1 | 1/2001 | Bally et al. | |
| 6,311,951 B1 * | 11/2001 | Samulowitz | 251/129.16 |
| 6,318,213 B1 | 11/2001 | Hendrix et al. | |
| 6,349,487 B1 | 2/2002 | Hice | |
| 6,591,797 B2 | 7/2003 | Entzminger | |
| 6,830,231 B2 * | 12/2004 | Paessler et al. | 251/64 |
| 7,111,444 B1 | 9/2006 | Morris et al. | |
| 7,172,532 B2 | 2/2007 | Baker | |
| 7,226,034 B2 * | 6/2007 | Stark et al. | 251/76 |
| 7,226,393 B2 | 6/2007 | Baker | |
| 7,309,303 B1 | 12/2007 | Proctor | |
| 7,364,533 B2 | 4/2008 | Baker | |
| 2008/0179556 A1 * | 7/2008 | Lasa et al. | 251/129.21 |
| 2010/0038572 A1 * | 2/2010 | Alvarez et al. | 251/129.15 |
| 2011/0155931 A1 * | 6/2011 | Weiss | 251/65 |

FOREIGN PATENT DOCUMENTS

| | | |
|---|---|---|
| JP | 2001-235051 A | 8/2001 |
| KR | 10-0181332 B1 | 4/1999 |
| WO | WO 95-14874 A1 | 6/1995 |

\* cited by examiner

PILOT OPERATED WATER VALVE

FIELD OF THE INVENTION

This invention generally relates to pilot operated valves, and more particularly to mechanisms for controlling the position of the pilot valve member used for actuation of the main valve member in pilot operated water valves.

BACKGROUND OF THE INVENTION

Valves are used in many applications wherein the control of the flow of a process fluid is needed. Such process fluids may include liquids such as oil, fuel, water, etc., or gases such as, e.g., natural gas, oxygen, etc. Some valves operate to meter the flow of fluid therethrough and operate by accurately positioning the valving member to control the amount of fluid allowed to pass through the valve. Other valves operate in a switching fashion wherein the flow of fluid therethrough is either turned on or turned off. Such valves may be utilized, for example, in consumer and commercial appliances such as washing machines, etc., whereby water is allowed to flow for a predetermined period of time or until a predetermined volume has been dispensed therethrough. The control of the operation of such valves is typically performed by an electronic control circuit, such as a micro processor-based controller, along with its associated drive circuitry, to open and/or close the valving member within the valve.

A problem with such switching valves is the force necessary to open the valving member against the static pressure of the process fluid acting on one side of the valving member. Depending on the application, this pressure may be quite high, particularly when compared with the low pressure on the opposite side of the valving member which, in many appliance applications, is at atmospheric pressure. In addition to the static fluid pressure acting on the valving member tending to keep it closed, many such switching valves also include a spring positioned to apply a force on the valving member. This spring force allows the valve to be closed upon the removal of a drive signal, and maintains a bias force on the valving member to keep it closed.

In such configurations, the valve actuator must overcome both the static fluid pressure, which can be quite high and may vary from installation to installation, as well as the spring force, both of which are acting to keep the valve closed. Once these two forces have been overcome, however, the force necessary to continue to open the valve to its fully open position is substantially reduced as the pressure differential across the valving member face drops dramatically. Once this pressure has been equalized, the only remaining force against which the actuator must act is the spring force.

Many electronically controlled switching valves include an electrically actuated solenoid to directly act on a plunger connected to the valving member to move the valving member to its open position. Unfortunately, due to the high pressure differentials that exist for a closed valve and the spring force, the actuator needs to be relatively large so that it is able to reliably operate the valve under all operating conditions and installations. In many industries, such as the consumer appliance industry, strict Governmental and certifying agency requirements place a heavy premium on an electric power usage. As such, these direct acting solenoid controlled valves that include solenoids sized to reliably open the valving member provide a significant disadvantage to the appliance manufacturer in being able to attain agency certification as, for example, as an Energy Star appliance rated appliance. Further, the appliance industry is highly competitive and the cost of such large solenoid actuators also provides a significant detriment to their use.

To overcome these problems many manufacturers have gone to a pilot valve design that allows for a significantly reduced size solenoid actuator to be used to operate the valve. Such pilot operated water valves utilize a relatively small solenoid to move a plunger to open a small pilot valve having a small pilot opening in the valving section. When opened, this pilot valve allows a small amount of water to flow and open a diaphragm using the principle of differential pressure and surface area. The diaphragm then opens the main valving member that controls the main flow of the process fluid. In other words, pilot operated valves take advantage of the energy of the process fluid pressure to do most of the work to open and close the valve.

Since the solenoid now need only open the small pilot valve, its size may be substantially reduced. This small size results in a lower energy usage as well as lower costs, both providing a significant advantage in many industries, such as the consumer appliance industry. As a result, appliance manufacturers, such as the assignee of the instant application, provide literally millions of pilot operated water valves each year.

While the pilot operated water valves provide a substantial reduction in the solenoid actuator size, and therefore cost, over direct acting solenoid actuated valves, the solenoids still rely on copper wire windings to generate the magnetic force needed to operate the pilot valve actuator. It is not uncommon for the coil cost including copper to be fifty percent or more of the total valve cost. Unfortunately, in such a competitive industry, the difference of only a few cents can make or break a major sale. There exists a need in the art for a new pilot valve design that reduces the material costs by reducing the amount of copper used therein. Countering this copper reduction effort, however, is the requirement for reliable operation at each actuation and continued long life of such valves.

Embodiments of the present invention provide such a pilot operated water valve having reduced material costs while still providing reliable actuation and long operational life. These and other advantages of the invention, as well as additional inventive features, will be apparent from the description of the invention provided herein.

BRIEF SUMMARY OF THE INVENTION

In view of the above, embodiments of the present invention provide a new and improved pilot operated water valve that overcomes one or more of the problems existing in the art. More specifically, embodiment of the present invention provide a new and improved solenoid actuated pilot valve that is more compact and utilizes less energy than previous pilot operated water valves known in the art.

In one embodiment, a compact, low power pilot operated water valve utilizes a lever arm to operate an offset pilot valve member. In such an embodiment, the mechanical advantage provided by the lever arm substantially reduces the amount of power required, and therefore the size of the solenoid used to operate the pilot valve. Such a lever arm may utilize a single or multiple point fixed fulcrum, or may utilize a profiled, stepped, or otherwise variable fulcrum to more closely match the power available from the solenoid to the opening requirements of the pilot valve.

In certain embodiments of the present invention, a plunger mechanically couples the pilot valve lever arm within the process fluid to control the positioning of the pilot valving member. Such embodiments utilize a spring force to position the plunger in a quiescence state, and use the magnetic force generated by the solenoid coil during energization to move the plunger to move the lever arm. Such magnetic force, in addition to overcoming the static pressure on the pilot valving member from the process fluid, must also overcome the spring force used to hold the pilot valving member in its closed position. In one embodiment the spring force is provided by a coil spring positioned to hold the plunger in its quiescence state. In other embodiments, the spring force is provided by spring arms formed from the lever arm body itself.

In other embodiments of the present invention the lever arm of the pilot valving member is controlled by the magnetic force of the solenoid coil itself, without the use of a plunger or mechanical contact therewith. In such embodiments, the lever arm includes at least a portion thereof that is ferromagnetic. Such embodiments also utilize a spring force to hold the pilot valving member in its quiescence state. Since such embodiments do not include any mechanical penetration of the main valving chamber, the spring force is provided by a spring mechanism within the valve body itself.

In applications that require only a very low flow of fluid, such as an ice maker for a consumer refrigerator/freezer, the pilot valve mechanism and control therefor may be utilized alone to provide a direct acting valve for such applications.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
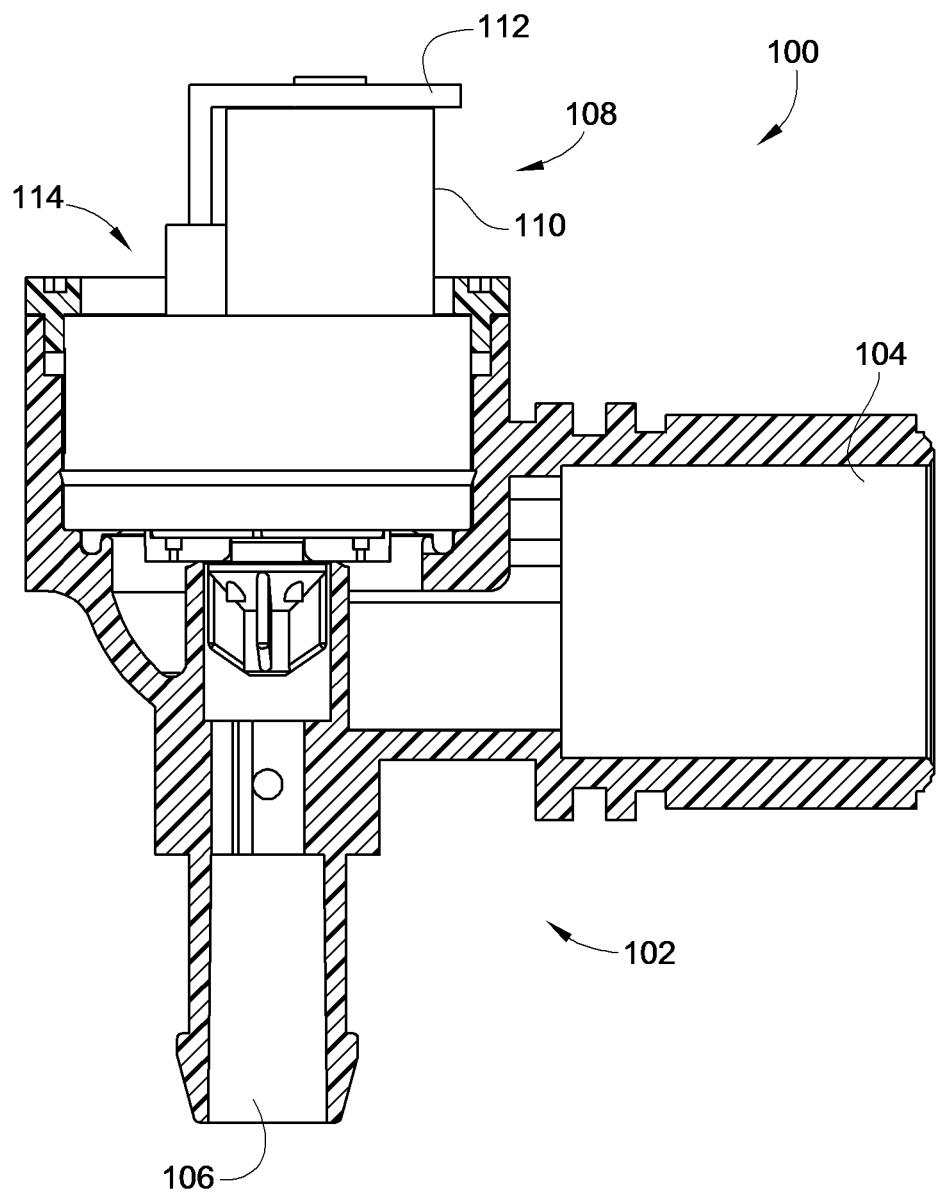
FIG. 1 is a side view partial cutaway illustration of an embodiment of a compact, low power (CLP) pilot operated water valve constructed in accordance with the teachings of the present invention.

Turning now to the drawings, there is illustrated in FIG. 1 a compact, low power (CLP) pilot operated water valve 100 constructed in accordance with the teachings to the present invention. While the following description will describe various embodiments and applications thereof, those skilled in the art will recognize that other embodiments and applications may be constructed and are within the scope of the present invention. Indeed, as will become apparent to those skilled in the art from the following description, while the description below will discuss various aspects of the invention in an embodiment forming a single valve for ease of understanding, the pilot valve assembly and means for control thereof may be configured in a gang valve assembly, e.g. a mixing-type valve, having two or more valving assemblies with two or more pilot valving assemblies to control operation thereof. Therefore, the following description should be taken by way of example, and not by way of limitation.

As illustrated in FIG. 1, the CLP valve 100 utilizes a valve body 102 forming an inlet 104 and an outlet 106. While the embodiment illustrated in FIG. 1 utilizes a valve body 102 having a ninety degree orientation between the inlet 104 and outlet 106, other inlet to outlet configurations are possible, at least one of which will be illustrated in subsequent figures, and therefore their configuration should not be taken as limiting on the scope of the present invention.

The CLP valve 100 also includes a solenoid assembly 108 to provide the actuating power to control, ultimately, the operating state of the CLP valve 100. As will be recognized by those skilled in the art, the solenoid assembly 108 includes a coil 110 and a magnetic frame structure 112 which aids in defining the magnetic path of the lines of flux when the coil 110 is energized. In order to utilize a small solenoid assembly 108, the CLP valve 100 utilizes a small pilot valve to control the flow of a small amount of bypass fluid which, as known in the art, then allows the main process fluid to control the positioning of the main valving member.

Unique to the CLP valve 100 of the present invention is the means 114 for controlling the pilot valving member. As will be discussed in more detail below with regard to specific embodiments of the present invention, the means 114 for controlling the pilot valving member includes the positioning of the pilot valve opening away from the central axis of the solenoid assembly 108. The relative positioning of the central axis of the solenoid assembly 108 from the pilot valve opening allows the means 114 to include a lever arm 116 (see e.g., FIG. 2) to provide a mechanical advantage or inverse force multiplication of the force supplied by the solenoid assembly 108 so that sufficient force is available to move the pilot valving member from its closed to its open position. Because pilot valves utilize the pressurized controlled fluid as the operation energy source for the main valve, the solenoids of prior pilot valves are relatively large and expensive compared to the CLP valve 100 due to the direct acting designs of these prior designs. As a result, the CLP valve 100 use less electric power and is more energy efficient compared to the prior designs, by as much as 50%-80% while achieving the same outcome.

As will be discussed more fully below, the means 114 includes in one embodiment a plunger 118 (see FIG. 2) to control the movement of the lever arm 116, and in other embodiments (see e.g., FIG. 7) a ferromagnetic lever arm 116' that may be acted upon directly by the magnetic force in a plungerless configuration to control the position of the pilot valving member.

Figure 2:
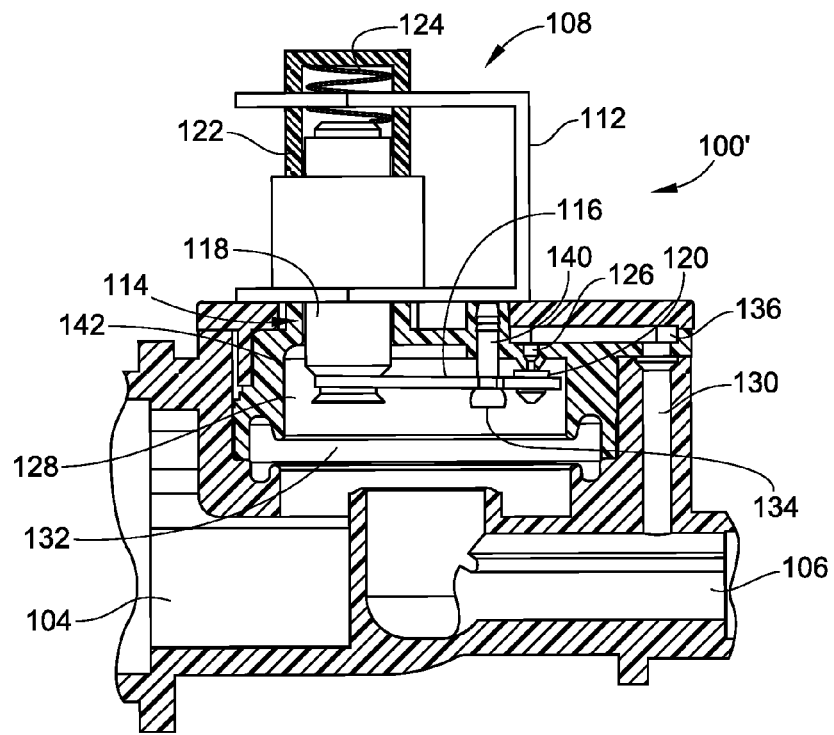
FIG. 2 is a partial cutaway illustration of an embodiment of the CLP pilot operated water valve of FIG. 1 utilizing a plunger to control the positioning of the pilot valving member, shown in a closed position, and having a straight though valve body configuration.

Turning specifically to FIG. 2, there is illustrated one embodiment of the CLP valve 100' that utilizes a magnetically actuated plunger 118 mechanically coupled to the lever arm 116 as part of the means 114 for controlling the pilot valving member 120. The illustration of FIG. 2 does not include the coil so that the internal features of the solenoid assembly 108 may more easily be shown.

Specifically, in this embodiment the coil assembly 108 is positioned around a guide tube 122 formed by the main valving chamber body 142 in which is moveably positioned the plunger 118. This plunger 118 is held in its quiescence position by spring 124 when the solenoid coil is not energized. As shown in this FIG. 2, the quiescence state for this embodiment of the CLP valve 100' maintains the pilot valving member 120 in contact with or in a closed relation to the pilot valve opening 126, which prevents fluid flow from the main valving chamber 128 through the bypass channel 130 to the outlet 106. In this state, and as will be recognized by those skilled in the art, the process fluid pressure will act to keep the main valving member 132 closed to prevent the process fluid from flowing from the inlet 104 to the outlet 106. Specifically, the main valving member 132 closes due to small bleed hole(s) (see, e.g. bleed holes 202 illustrated in FIG. 7) therein that allow pressure to build up and equalize the main valving chamber 128 with the inlet pressure when the pilot valving member 120 is closed. As should be apparent to those skilled in the art from an examination of this FIG. 2, the plunger 118 is in contact with the process fluid in the main valving chamber 128. As such, the material from which this plunger 118 is constructed must be selected to be compatible with the process fluid controlled by this CLP valve 100'.

Figure 3:
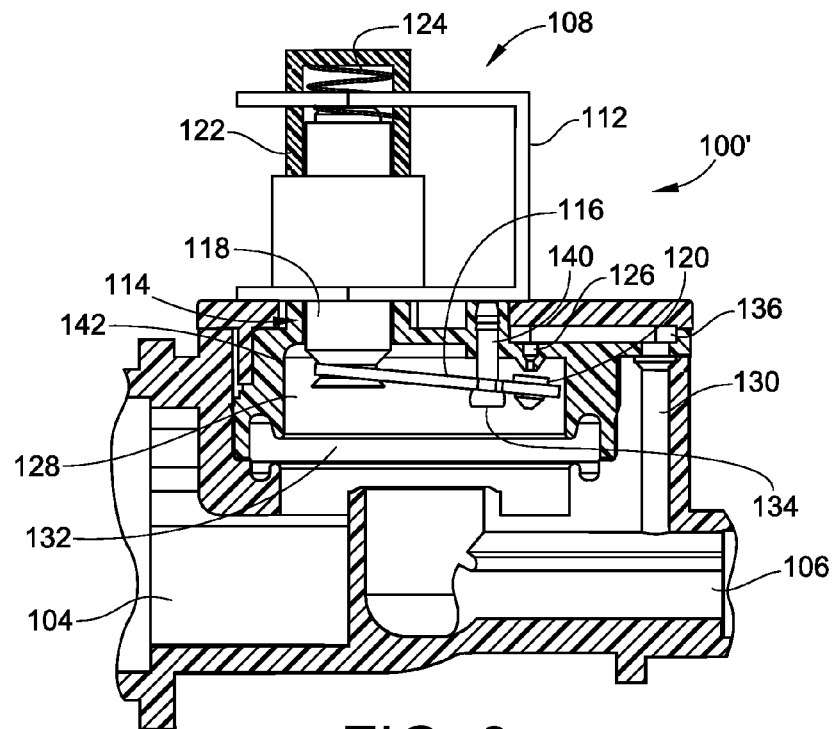
FIG. 3 is a partial cutaway illustration of the embodiment of the CLP pilot operated water valve of FIG. 2 illustrating the pilot open position.

Once the solenoid assembly 108 has been energized, the magnetic force created by the coil (not shown) causes the plunger 118 to move in an upward direction as shown by the orientation of FIG. 3. The magnetic force necessary must be sufficient to overcome the spring force of spring 124 as well as the static fluid pressure on the pilot valving member 120. However, because the means 114 for controlling the pilot valving member 120 utilizes the lever arm 116 that pivots about fulcrum 134, the force required to be generated by the solenoid assembly 108 does not need to equal that force to directly overcome the static fluid pressure since the lever arm 116 and the positioning of the fulcrum 134 provide an inverse force multiplication. This allows for the solenoid assembly 108 to be much smaller than that which would be required if the CLP valve 100' did not utilize the means 114 for controlling the pilot valving member 120. As such, a smaller coil (not shown) may be utilized, thereby reducing the costs significantly in view of the operating power reduction provided by this design and in view of the current and projected cost of copper from which the wire of the coil is made.

As will be recognized by those skilled in the art, once the pilot valving member 120 has been unseated from the pilot valve opening 126 by the pivoting of the lever arm 116 on the fulcrum 134, the process fluid will begin to flow from the pilot valve opening 126 through the bypass channel guide member 136 into the bypass channel 130 to the outlet 106. This will result in a reduction in the fluid pressure above the main valving member 132 in the main valving chamber 128. The process fluid pressure on the underside of the main valving member 132 from the inlet 104 will then cause the main valving member 132 to rise in the illustration of FIG. 3 and open the CLP valve 100' to allow the process fluid to flow freely from the inlet 104 to the outlet 106.

When the solenoid coil (not shown) is de-energized, the force from spring 124 will cause the plunger 118 to move downwardly which, via the lever arm 116 and the fulcrum 134, will cause the pilot valving member 120 to close against the pilot valve opening 126. This will cause an increase in the process fluid pressure above the main valving member 132 in the main valving chamber 128 due to the flow of process fluid through the small bleed hole(s) in the main valving member 132 that allow pressure to build up and equalize the main valving chamber 128 with the inlet pressure, and will cause the main valving member 128 to move downwardly to again close the CLP valve 100' as illustrated in FIG. 2.

Figure 4:
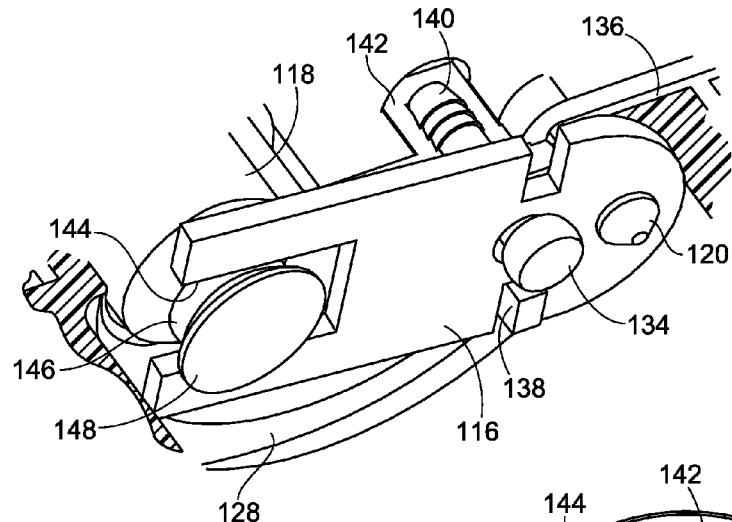
FIG. 4 is a partial cutaway isometric illustration of the embodiment of the CLP pilot operated water valve of FIG. 2 illustrating one embodiment of the lever arm used to actuate the pilot valving member.
Figure 5:
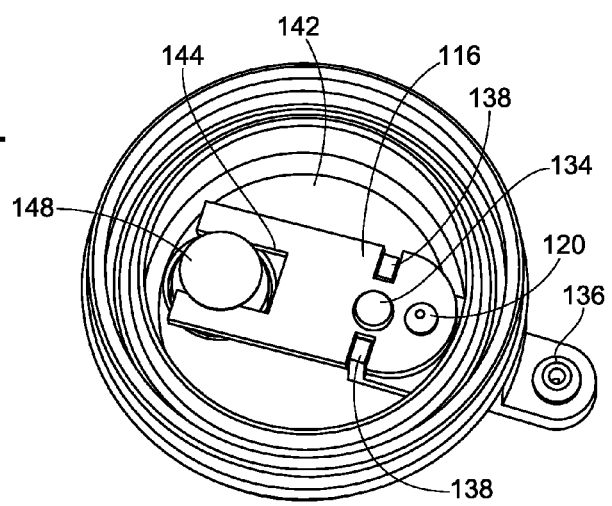
FIG. 5 is a bottom view illustration of the embodiment illustrated in FIG. 4.

As may be seen in more detail in FIGS. 4 and 5, the lever arm 116 is held in position within the main valving chamber 128 in the illustrated embodiment by the larger diameter end of the fulcrum 134. The fulcrum 134 also includes a smaller diameter shaft portion 140 that is received through the lever arm 116 and is secured within the main valving chamber body 142. A pair of lever arm guide shoulders 138 may also be provided to hold the lever arm 116 in place. As shown in this embodiment, the lever arm 116 also includes a plunger mating slot 144 which is sized to receive a necked down portion 146 of plunger 118. To ensure that the plunger 118 can transition the lever arm 116, the plunger 118 also includes a larger diameter end flare 148 whose diameter is larger than the width of the plunger mating slot 144. Such a configuration simplifies the construction and ensures reliable operation of the bypass pilot valve portion of the CLP valve 100'.

Figure 6:
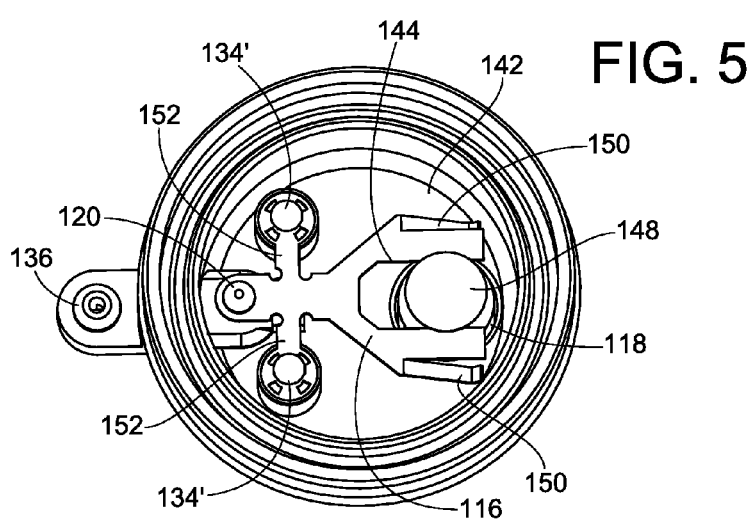
FIG. 6 is a bottom view illustration of alternative embodiment of a plunger actuated CLP pilot operated water valve similar to the embodiment illustrated in FIG. 2 but utilizing a spring loaded lever arm.

While the embodiments illustrated in FIGS. 2-5 utilize a spring 124 to position the plunger 118 during its quiescence state, an alternate embodiment illustrated in FIG. 6 dispenses with the need of spring 124 by providing spring arm members 150 as part of the lever arm 116 construction. Specifically, in this embodiment the lever arm 116 is constructed from spring steel or other resilient material that allows for repeated slight deformations thereof without fatigue stress failures. The spring arm members 150 act against the main valving chamber body 142 to keep the plunger 118 in its quiescence position when the solenoid coil (not shown) is not energized.

Once the solenoid coil is energized, the magnetic force acting on plunger 118 causes the plunger 118 to transition against the force of the spring arm members 150 in a direction into the page as viewed from FIG. 6. As the right end of the lever arm 116 is moved by the plunger 118, the pilot valve member 120 is moved in the opposite direction resulting in a slight twist of the fulcrum arms 152 of the lever arm 116. These fulcrum arms 152 are secured at their outer extent to the fulcrums 134' formed as part of or added to the main valving chamber body 142.

Figures 7, 8:
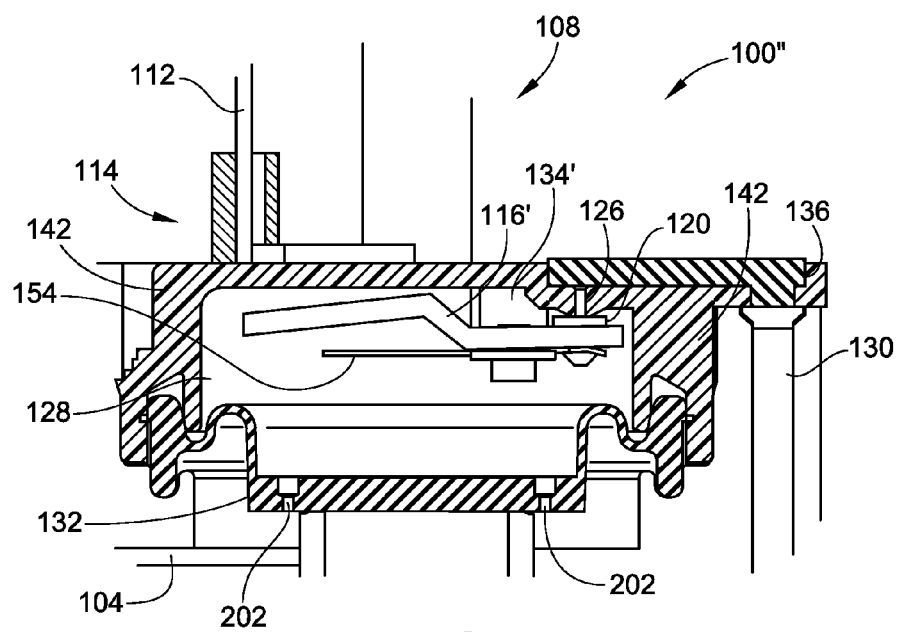
FIG. 7 is a partial cutaway illustration of an alternative embodiment of the CLP pilot operated valve of FIG. 1 utilizing a plungerless configuration, illustrating a closed position of the pilot valving member, and having a straight though valve body configuration.
FIG. 8 is a partial cutaway illustration of the embodiment illustrated in FIG. 7 showing the pilot valving member in an opened position.

In an alternate embodiment of the present invention, the means 114 for controlling the pilot valving member 120 does not utilize a plunger that is in contact with the process fluid in the main valving chamber 128, but instead utilizes the magnetic force generated by the solenoid coil to move a lever arm 116' that includes at least a portion thereof that is ferromagnetic as illustrated in FIG. 7. Since no plunger is required, the center spindle section of the magnetic frame structure 112 can be much smaller as may be seen in a comparison between FIG. 7 and e.g., FIG. 2, because no guide tube to house a plunger is needed. This allows for a much more compact coil design. Also because the magnetic frame structure 112 is not in contact with the process fluid, the use of more magnetically permeable materials, i.e. more efficient at conducting magnetic flux is enabled. Further, the use of low cost, e.g. low carbon steel, as opposed to the typical magnetic grade stainless steel, may be used because the material does not come in contact with the process fluid, which greatly reduces corrosion and contamination issues. Without a plunger and spring associated therewith to hold the lever arm in its quiescence position, this embodiment utilizes a spring member 154 within the main valving chamber 128 to perform this function. In other words, with the solenoid coil de-energized, the spring member 154 holds the lever arm 116' in the position shown in FIG. 7 such that the pilot valving member 120 is held in a closed position against the pilot valve opening 126.

Once the coil of the solenoid assembly 108 is energized, the magnetic field created thereby causes the ferromagnetic portion of lever arm 116' to be attracted toward the solenoid assembly 108 until it is in its fully attracted or opened position as illustrated in FIG. 8. The ferromagnetic lever arm 116 pivots about fulcrum 134' which, in the illustrated embodiment, is formed as part of the main valving chamber body 142. As the ferromagnetic lever arm 116' pivots about the fulcrum 134', the pilot valving member 120 is pulled away from the pilot valve opening 126, thereby allowing a bypass flow of process fluid to flow through the bypass channel guide member 136 into the bypass channel 130 to allow the main process fluid to actuate the main valving member 132 to open the CLP valve 100".

Upon de-energization of the coil of the solenoid assembly 108, the magnetic field is turned off, and the spring member 154 is again able to move the ferromagnetic lever arm 116' to its quiescence position, closing the pilot valving member 120 against the pilot valve opening 126, as shown in FIG. 7. In this position the increasing process fluid pressure in the main valving chamber 128 above the main valving member 132 will again cause the main valving member 132 to transition downwardly until it closes the CLP valve 100" as shown in FIG. 7.

Figure 9:
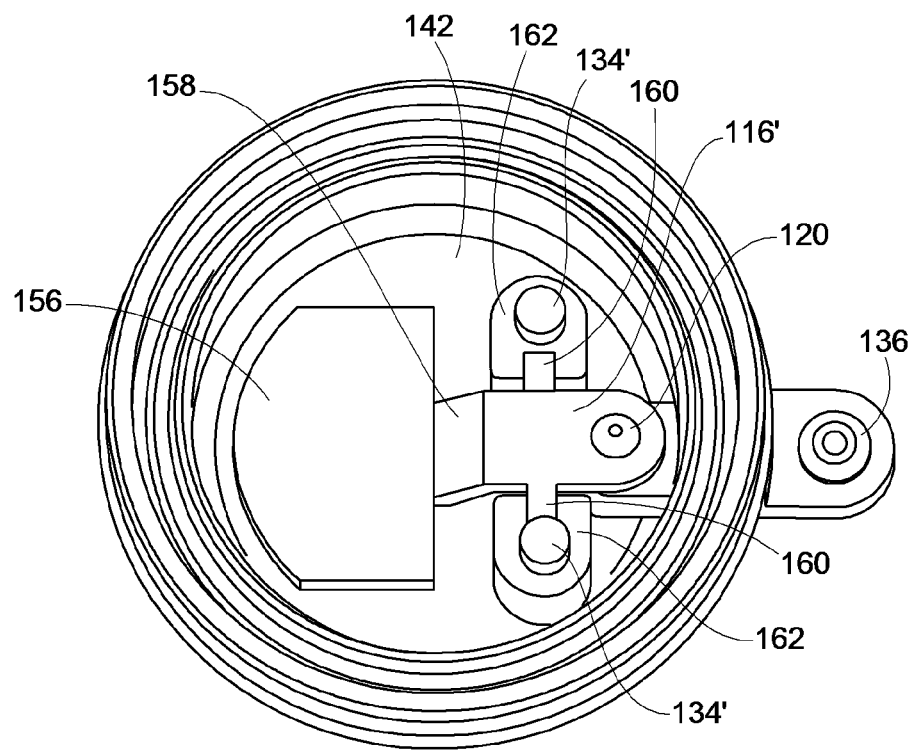
FIG. 9 is a bottom view illustration of the embodiment of FIG. 7 showing one configuration of the lever arm.

As may be seen from FIG. 9, the ferromagnetic lever arm 116' in the illustrated embodiment includes a magnetic surface 156 that is acted upon by the magnetic field generated by solenoid assembly 108. This magnetic surface 156 need not be magnetic in and of itself, but is preferably constructed from a ferromagnetic or/and a magnetically permeable material that is attracted by a magnetic field such as that generated by the coil of the solenoid assembly 108. Indeed, this magnetic surface 156 may be the only ferromagnetic portion of the ferromagnetic lever arm 116' although ease of manufacturing may dictate that the entire lever arm 116' be constructed from the same material.

To enable this magnetic surface 156 to be held flush against the inner surface of the main valving chamber body 142 when being acted upon by the magnetic field of the solenoid assembly 108, the ferromagnetic lever arm 116 includes an orientation portion 158 that provides the proper angling between the magnetic surface 156 and the portion of the ferromagnetic lever arm 116' that holds the pilot valving member 120. In the illustrated embodiment, the ferromagnetic lever arm 116' includes a pair of guide arms 160 that are positioned within a pair of guide posts 162 coupled to or formed from the main valving chamber body.

Figure 10:
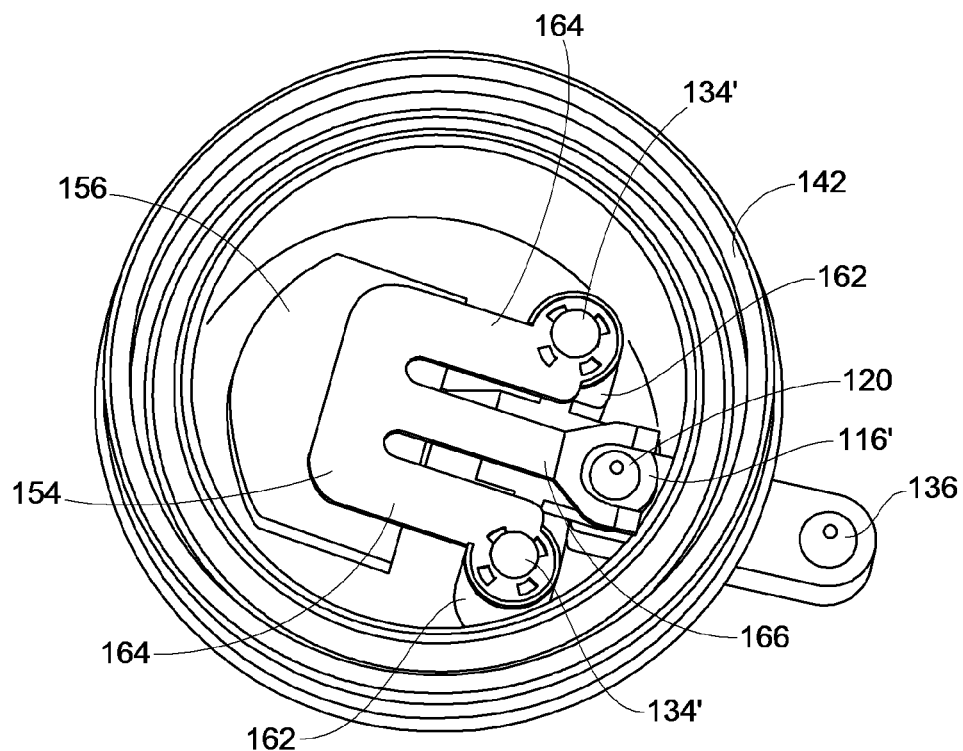
FIG. 10 is a bottom view illustration of the embodiment illustrated in FIG. 9 also including the spring mechanism used to position the pilot valving member in its quiescence state.

As shown in FIG. 10, the spring member 154 attaches to the pair of fulcrums 134' formed on top of the guide posts 162 via a pair of outer spring arms 164. The spring force is applied to the ferromagnetic lever arm 116' at a point near the pilot valving member 120 by a central spring arm 166.

Figure 11:
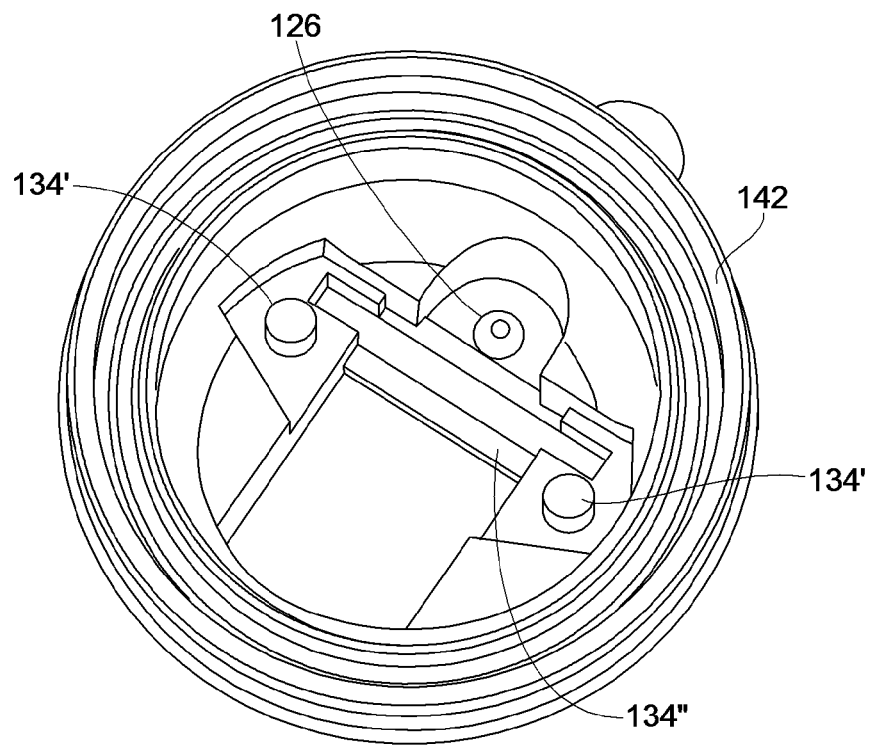
FIG. 11 is a bottom view illustration of an alternative embodiment of the CLP valve of FIG. 7 illustrating only the main valving chamber body member without the lever arm or spring mechanism installed therein.
Figure 12:
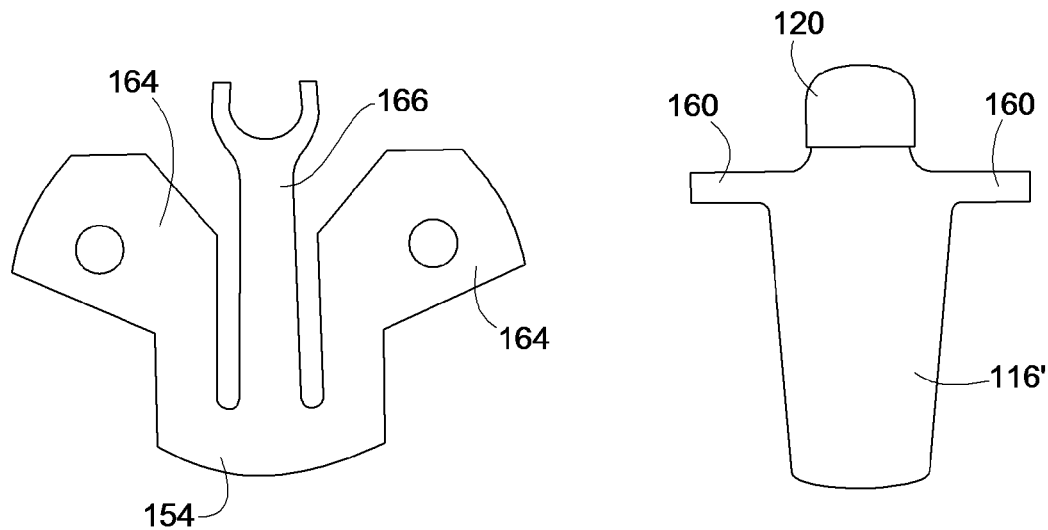
FIG. 12 is a bottom view illustration of an embodiment of the lever arm mechanism actuating the pilot valving member and an embodiment of a spring mechanism for use therewith, both of which to be installed in the embodiment illustrated in FIG. 11.

FIG. 11 illustrates an alternative embodiment of the main valving chamber body 142 that includes recesses therein to operatively support the ferromagnetic lever arm 116' and the spring member 154, embodiment of both are illustrated in FIG. 12. As may be seen in this alternative embodiment, the fulcrum 134" is formed as a central raised portion within the recess accommodating the ferromagnetic lever arm 116'. As will be discussed more fully hereinbelow, the profile of this fulcrum 134" can provide enhanced performance and allow for further reduction in the size of the solenoid assembly 108.

Figure 13:
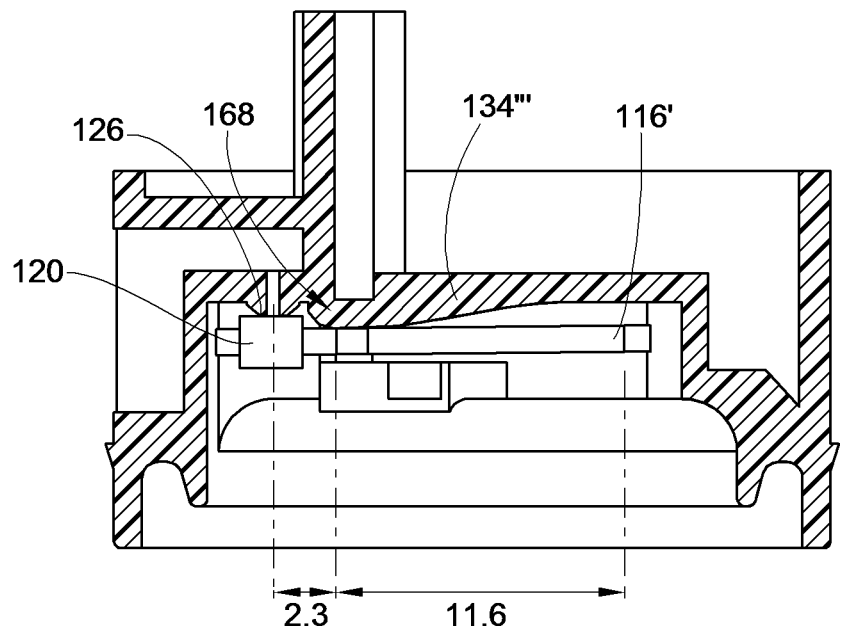
FIG. 13 is a partial cutaway side view illustration of an alternative embodiment of the CLP valve illustrated in FIG. 7 utilizing a profiled fulcrum to vary the opening force during actuation of the CLP valve, shown in the closed position.

Specifically, and with reference to FIG. 13, a profiled fulcrum 134''' provides a moving pivot point that changes the force magnification and linear movement rate as the ferromagnetic lever arm 116' is transitioned from its quiescence position to its fully actuated position under force of the magnetic field generated by the solenoid assembly 108. That is, as shown in FIG. 13, when the ferromagnetic lever arm 116' is held in its quiescence position with the pilot valving member 120 held closed against the pilot valve opening 126, the pivot point 168 is positioned such that the leverage opening ratio is approximately five to one (~5:1). This provides significant force multiplication and little linear movement of the pilot valving member 120 upon initial energization of the solenoid coil. This allows a relatively small solenoid coil to produce, through the ferromagnetic lever arm 116' enough force to overcome the static closed pressure acting on the pilot valving member 120 (and to overcome the spring force).

Figure 14:
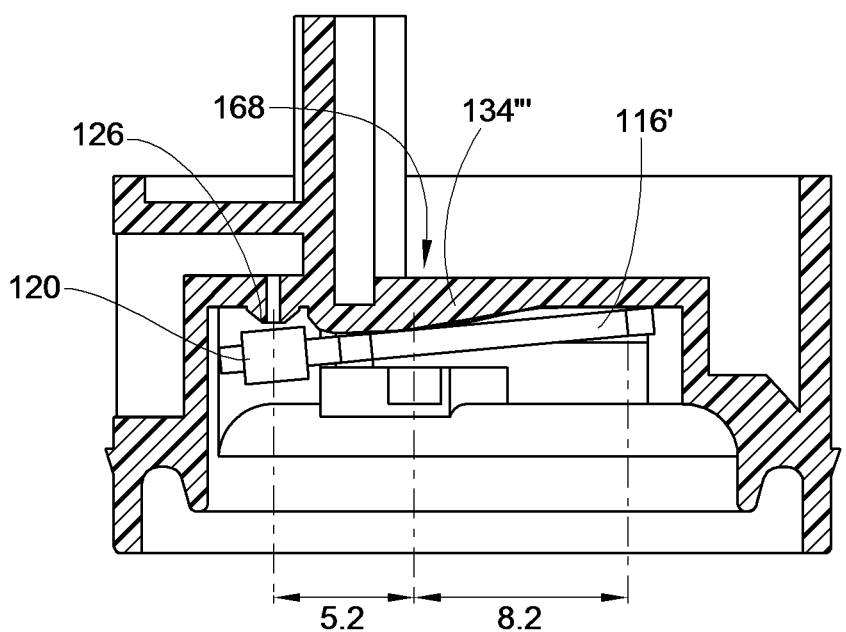
FIG. 14 is a partial cutaway side view illustration of the embodiment illustrated in FIG. 13 showing the pilot valving member in an opened position.

However, once the pilot valving member 120 has opened from the pilot valve opening 126, the force required to move the pilot valving member to its fully opened position is significantly reduced over that required to provide the initial opening itself. However, as the ferromagnetic lever arm 116' comes into closer proximity with the solenoid coil, the amount of magnetic force acting thereupon is significantly increased (the magnetic force is inversely related to the square of the distance). However, such increased force is not necessary as the force acting on the pilot valving member is significantly reduced once it has been opened. By providing the profiled fulcrum 134''', the pivot point 168 moves to change the leverage opening ratio to approximately 1.5 to 1 (~1.5:1). This results in less force multiplication by the lever arm, but increased linear movement rate of the pilot valving member 120 away from the pilot valve opening 126 as shown in FIG. 14. In other words, the profiled fulcrum 134''' provides greater leverage when needed at initial opening as shown in FIG. 13, while providing greater movement when needed after opening as illustrated in FIG. 14.

Figure 15:
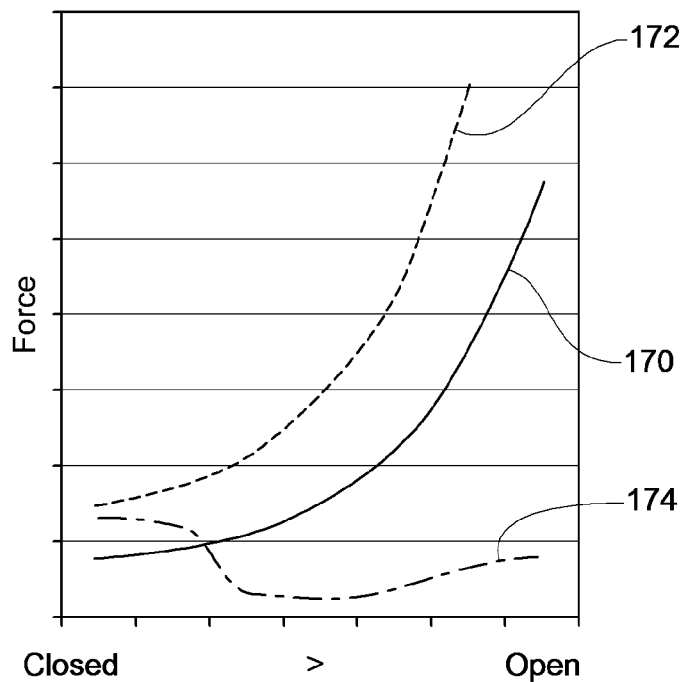
FIG. 15 is a graphical illustration showing the magnetic force and leverage provided by the solenoid utilizing a fixed fulcrum along with the required force to operate the pilot valving member.
Figure 16:
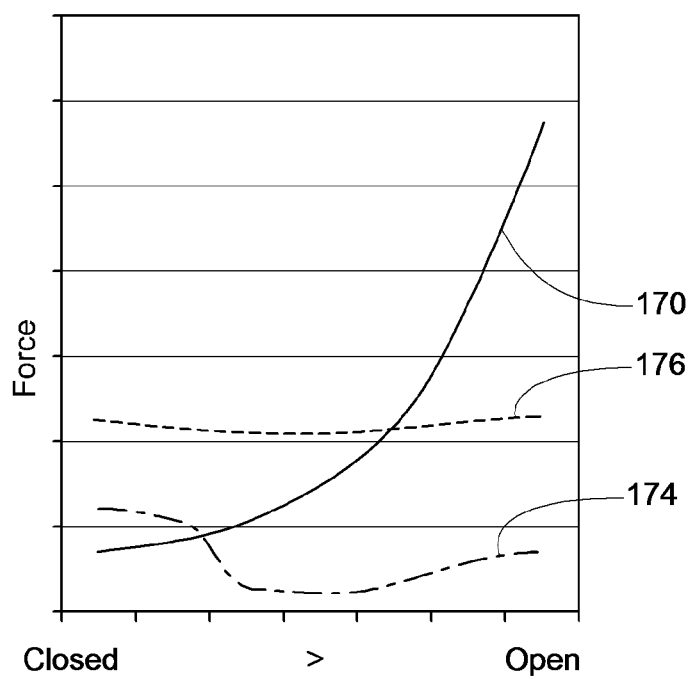
FIG. 16 is a graphical illustration of the magnetic force and leverage provided by the profiled fulcrum of FIG. 13 along with the required force to actuate the pilot valving member.

The benefit of such a profiled fulcrum 134''' may be realized through an analysis of the graphical illustration of the magnetic force, leverage, and required force illustrated in FIG. 15 for a fixed pivot point fulcrum embodiment and that of FIG. 16 for the profiled fulcrum 134''' embodiment. Specifically, each of the graphical illustrations includes a trace 170 that illustrates the magnetic force acting on the ferromagnetic lever arm 116' as it moves from the closed to the opened position (i.e., from farther away from to closer to the solenoid coil).

With a fixed point fulcrum embodiment, the leverage provided by the ferromagnetic lever arm 116' increases as the magnetic force acting on the lever arm 116' increases because the magnetic advantage leverage ratio does not change as shown by trace 172. However, the required force to move the pilot valving member 120, as shown by trace 174, actually decreases as it is moved from its closed to its open position.

However, as shown in FIG. 16, the leverage provided by the profiled fulcrum 134''' does not increase with the increasing magnetic force 170, but instead can be controlled to provide sufficient force when needed to open the pilot valving member, and can transition to allow greater movement with less application of force when such increasing force is not required.

Figure 17:
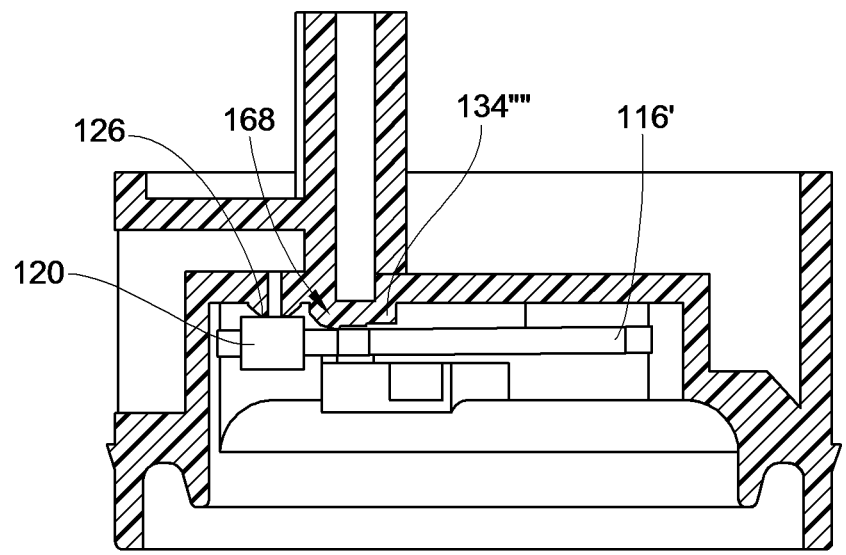
FIG. 17 is a partial cutaway side view illustration of an alternative embodiment of a CLP valve utilizing a stepped fulcrum shown in the closed position.
Figure 18:
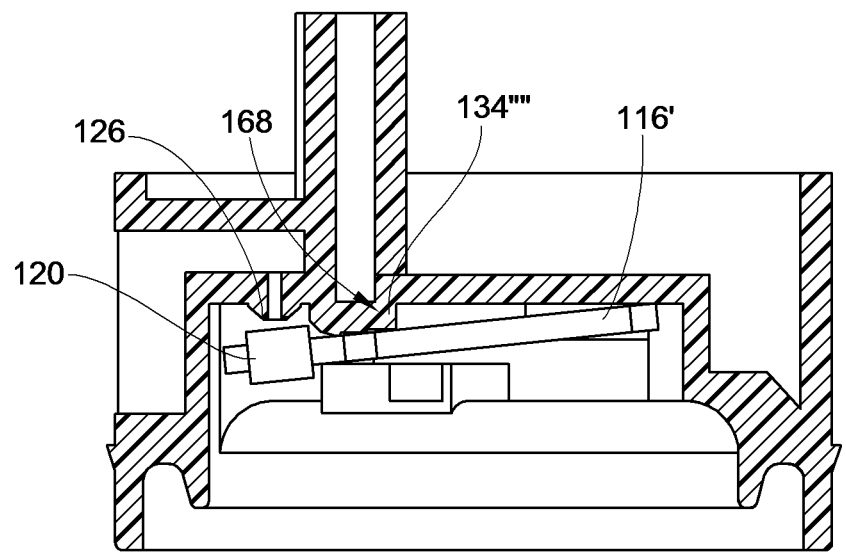
FIG. 18 is a partial cutaway side view illustration of the embodiment illustrated in FIG. 17 illustrating the pilot valving member in an opened position.
Figure 19:
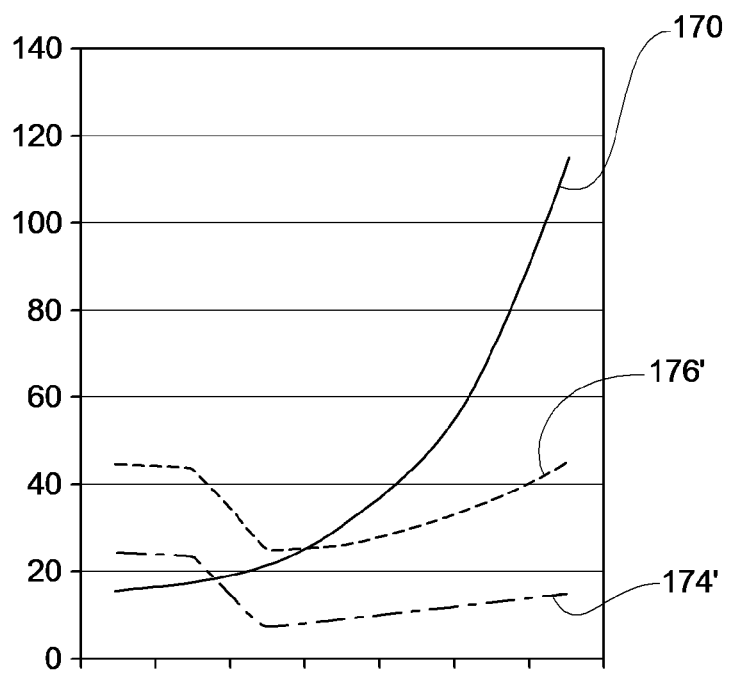
FIG. 19 is a graphic illustration of the magnetic force and the leverage provided by the embodiment of the CLP valve illustrated in FIG. 17 along with the required force to actuate the pilot valving member.

FIGS. 17-18 illustrate a similar principle, but instead of providing a profiled fulcrum as illustrated in FIGS. 13 and 14, a stepped fulcrum 134'''' is utilized to provide a stepped change in resultant force as shown in FIG. 19.

Figure 20:
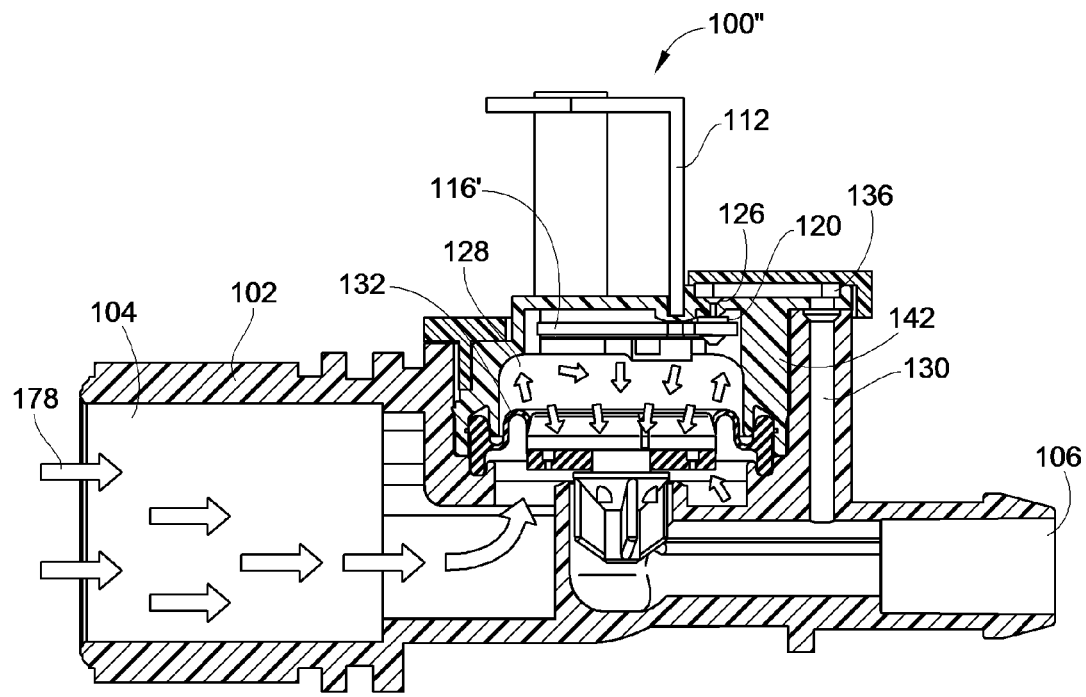
FIG. 20 is a partial cutaway side view illustration of an embodiment of a CLP valve having an internal bypass showing the fluid flow and force acting on the main valving member when the pilot valve is in the closed position.
Figure 21:
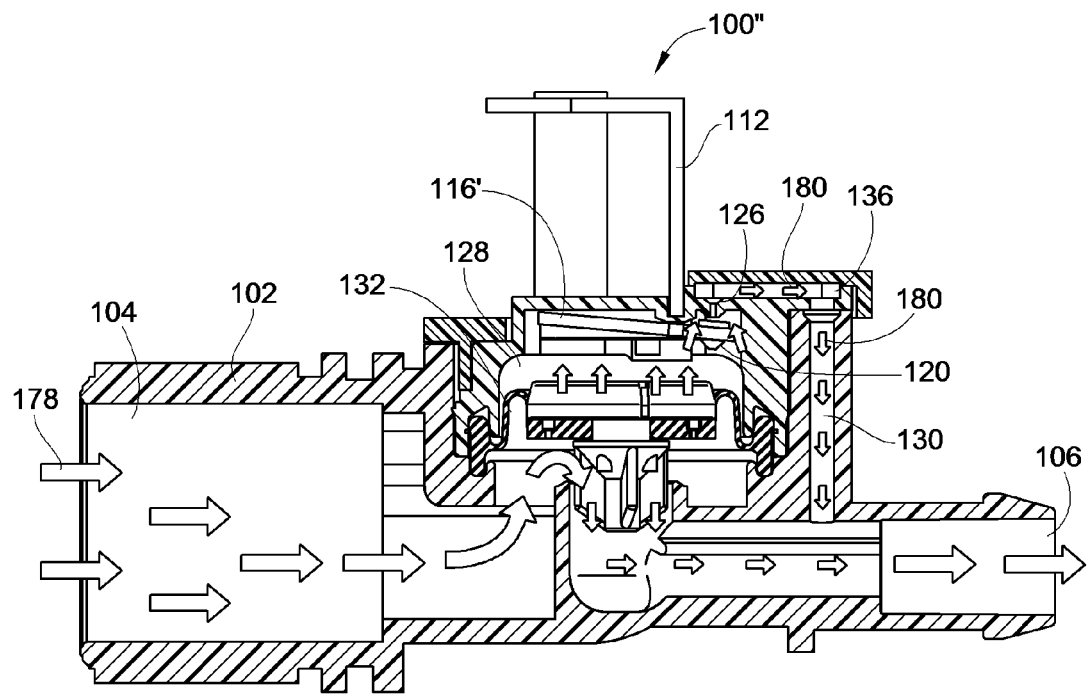
FIG. 21 is a partial cutaway side view illustration of the embodiment of the CLP valve of FIG. 20 illustrating fluid flow through the internal bypass when the pilot valving member is an open position, and the resulting main fluid flow therethrough as the main valving member is opened by the differential pressure of the process fluid.

FIGS. 20 and 21 illustrated an alternate embodiment of the CLP valve 100 providing an internal bypass and straight through flow design. As shown in FIG. 20 in a closed state, the process fluid pressure illustrated by arrows 178 flow up through the main valving member 132 and into the main valving chamber 128 wherein this pressure acts upon the larger surface area of the upper surface of the main valving member 132 to cause it to move downwardly into the closed position illustrated in FIG. 20. However, once the pilot valving member is opened by the attraction of the ferromagnetic lever arm 116', the pressure in the main valving chamber 128 is reduced as the process fluid flows as illustrated by arrows 180 through the bypass channel guide member 136, into the bypass channel 130, and out of the outlet 106. Since the pressure of the process fluid illustrated by arrows 178 is now greater than the pressure that has been released from the main valving chamber 128, the main valving member 132 moves upwardly to allow the process fluid to then flow from the inlet 104 to the outlet 106 as illustrated by main flow arrows 182.

Figure 22:
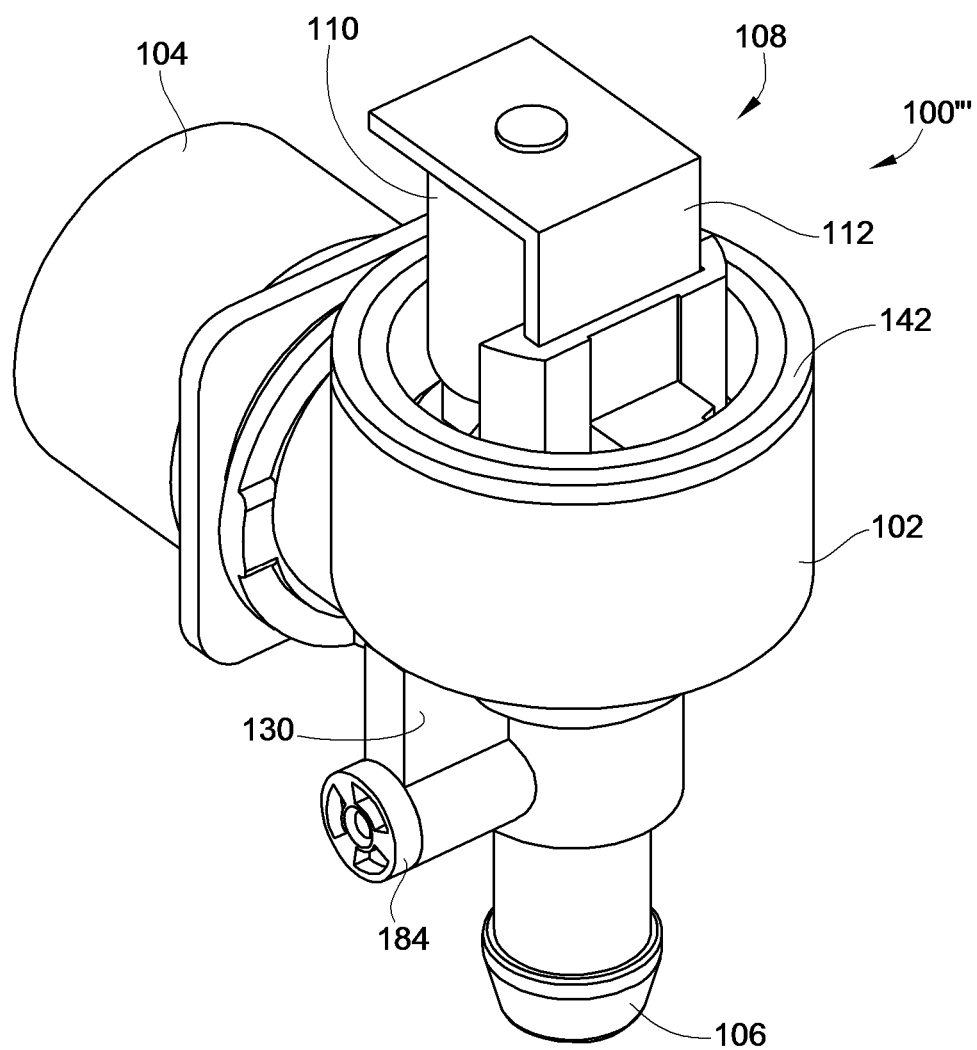
FIG. 22 is an isometric illustration of an alternative embodiment of a CLP valve having a ninety degree fluid flow configuration.

FIG. 22 illustrates an alternative embodiment of a CLP valve 100''' having a ninety degree flow configuration between the input 104 and the output 106. In such an embodiment, the internal bypass channel 130 must make a ninety degree turn to allow flow into the outlet 106. To ease manufacturing of such an embodiment, a bypass channel cap 184 is used to close the bypass channel 130 from the external environment. This bypass channel cap 184 may be spin welded or otherwise attached to the valve body 102.

Figure 23:
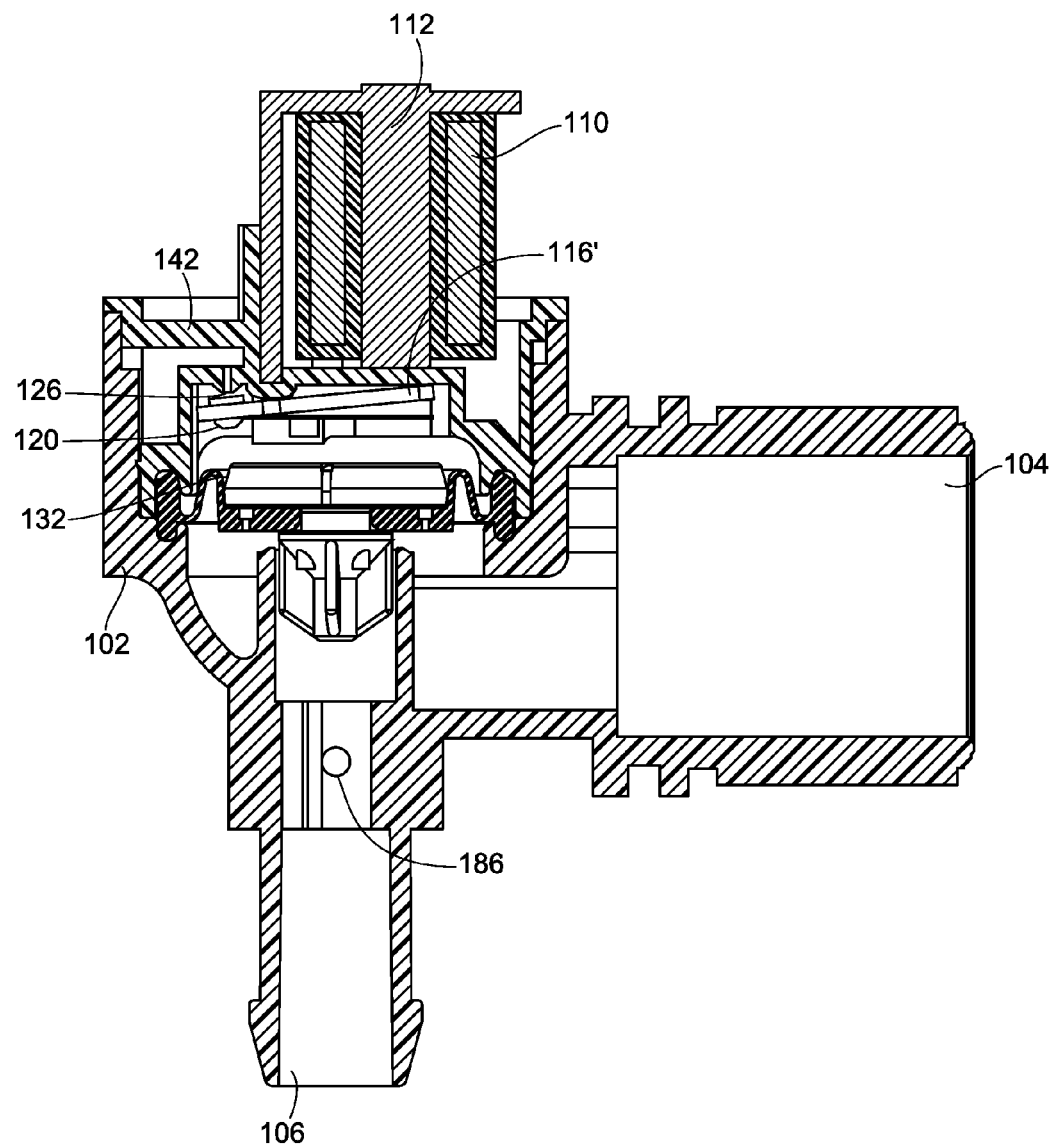
FIG. 23 is a partial cutaway side view illustration of the embodiment to the CLP valve shown in FIG. 22.
Figure 24:
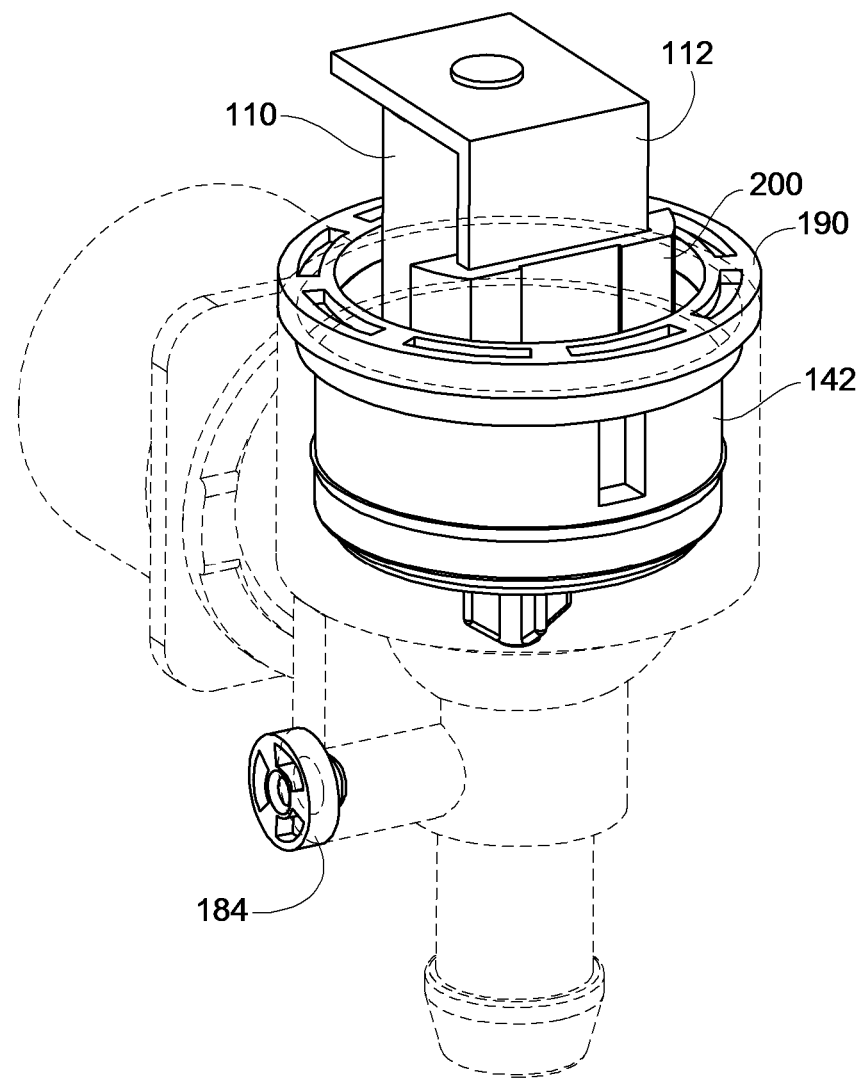
FIG. 24 is a partial phantom illustration of the embodiment to the CLP valve illustrated in FIG. 22.
Figure 25:
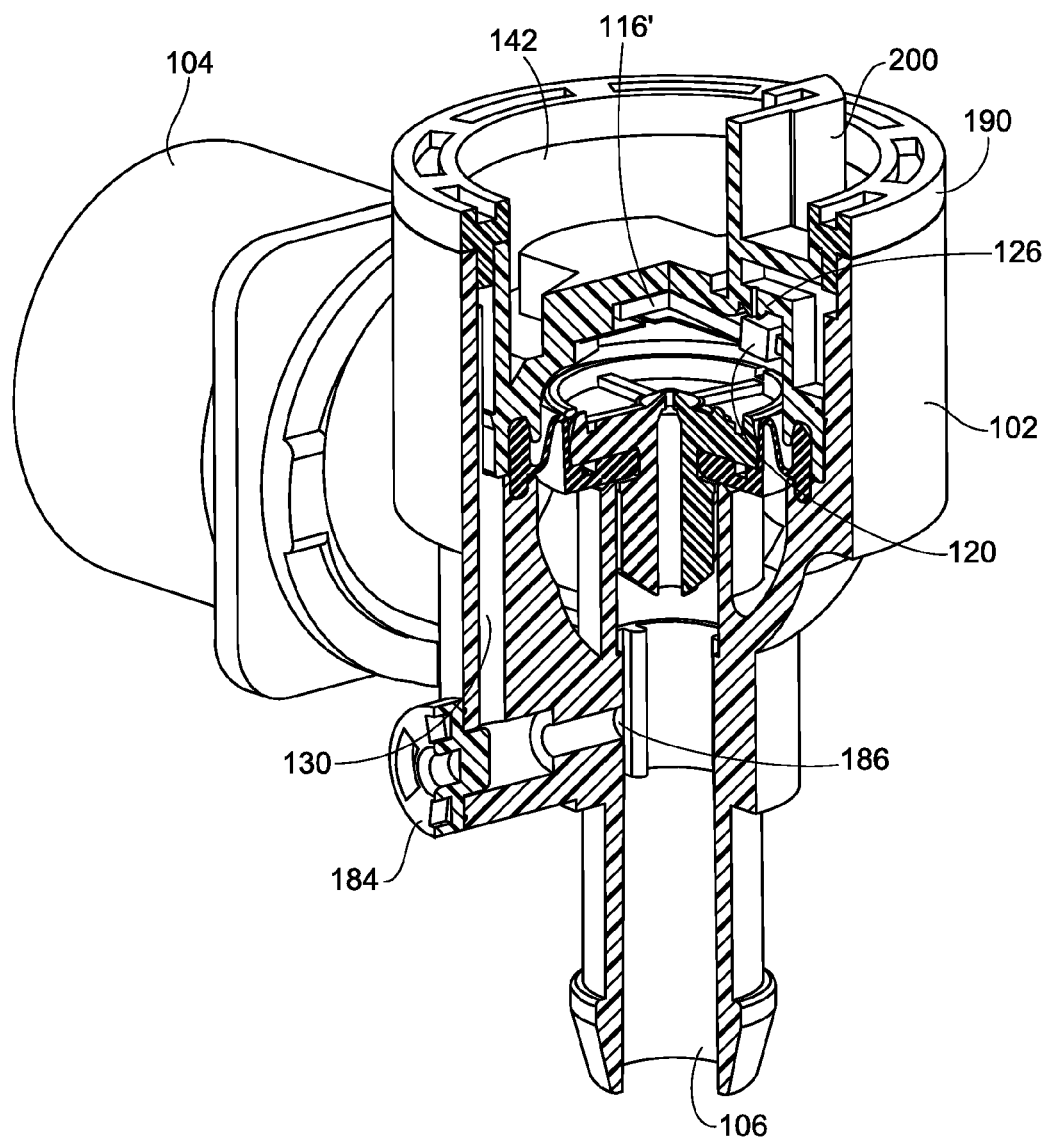
FIG. 25 is a partial cutaway illustration of an embodiment of the CLP valve shown in FIG. 22 showing the pilot flow path using a spin ring body configuration.

In such a configuration, the bypass channel 130 connects to a bypass channel termination port 186 illustrated in FIG. 23. The actual flow from the pilot valve opening 126 to the bypass channel termination port 186 may best be seen from the partial phantom diagram of FIG. 24 or the partial cutaway of FIG. 25. As may be seen in these illustrations, the flow of process fluid enters the pilot valve opening and flows into a chamber formed between the valve body 102 and the main valving chamber body 142. This chamber connects to the bypass channel 130, which terminates in fluid communication with the outlet 106. This chamber is closed in the embodiments illustrated in FIGS. 24 and 25 by a spin ring 190 as attached to the valve body 102 and to the main valving chamber body 142. Such attachment may be accomplished by spin welding, screw attachment, or other appropriate method. In an embodiment wherein the attachment uses a screw attachment, the pilot valve body 142 includes a coarse thread to provide a half turn lock down onto the main valve body 102. Preferably, an "o" ring is provided to seal the assembly. Such an embodiment dispenses with the need for the bypass channel guide member used in, for example, the embodiment illustrated in FIG. 20.

Figure 26:
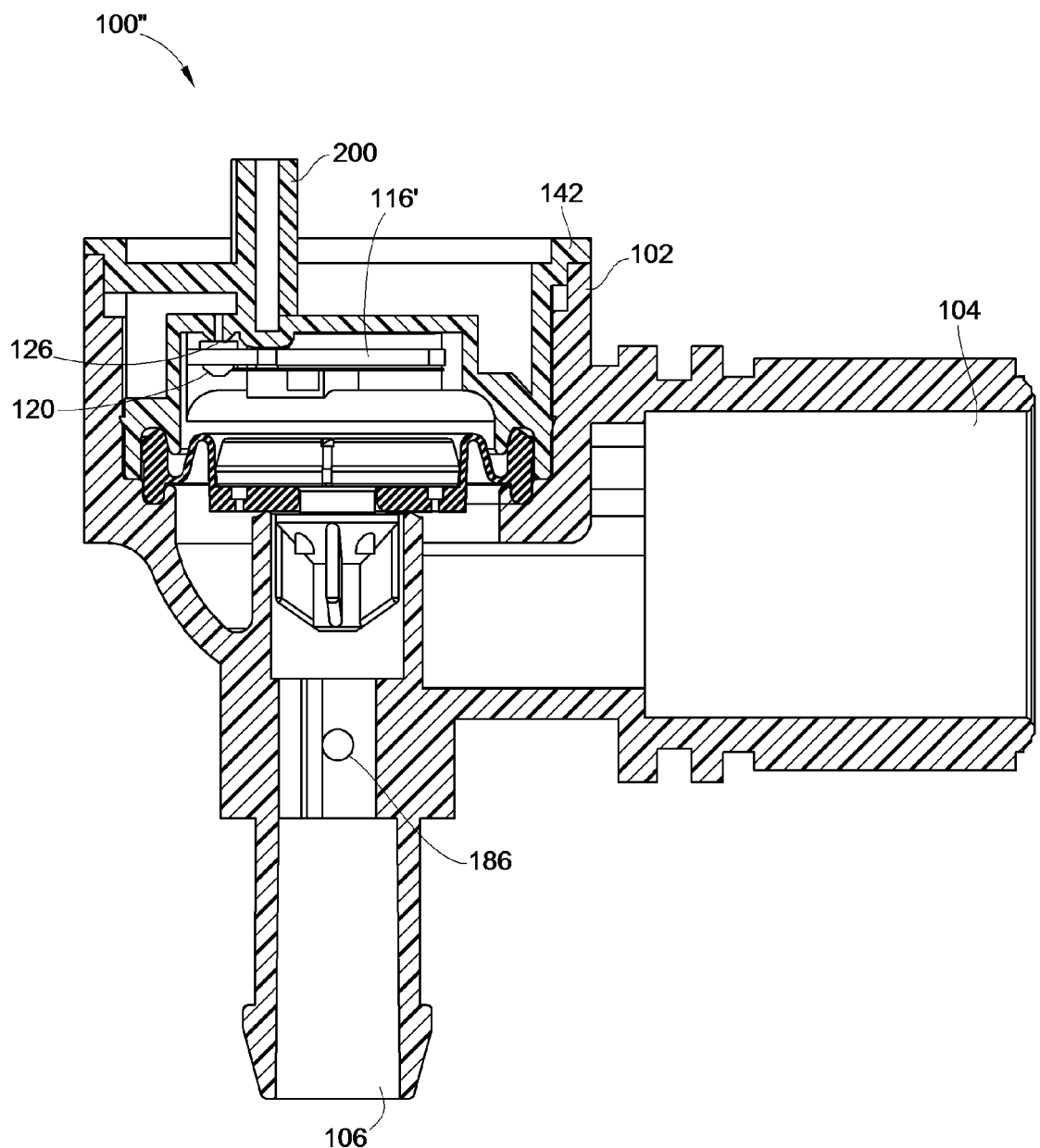
FIG. 26 is a partial cutaway illustration of an alternate embodiment of the CLP valve shown in FIG. 22 using a top hat configuration.

In an alternate embodiment of the present invention illustrated in FIG. 26, the separate spin ring 190 is eliminated through the configuration of the main valving chamber body 142 in a top hat configuration that forms the channel to couple to the bypass channel by connecting directly to the valve body 102. As with the spin ring, the coupling between the valve body 102 and the main valving chamber body 142 may be accomplished by spin welding or other appropriate attachment.

Figure 27:
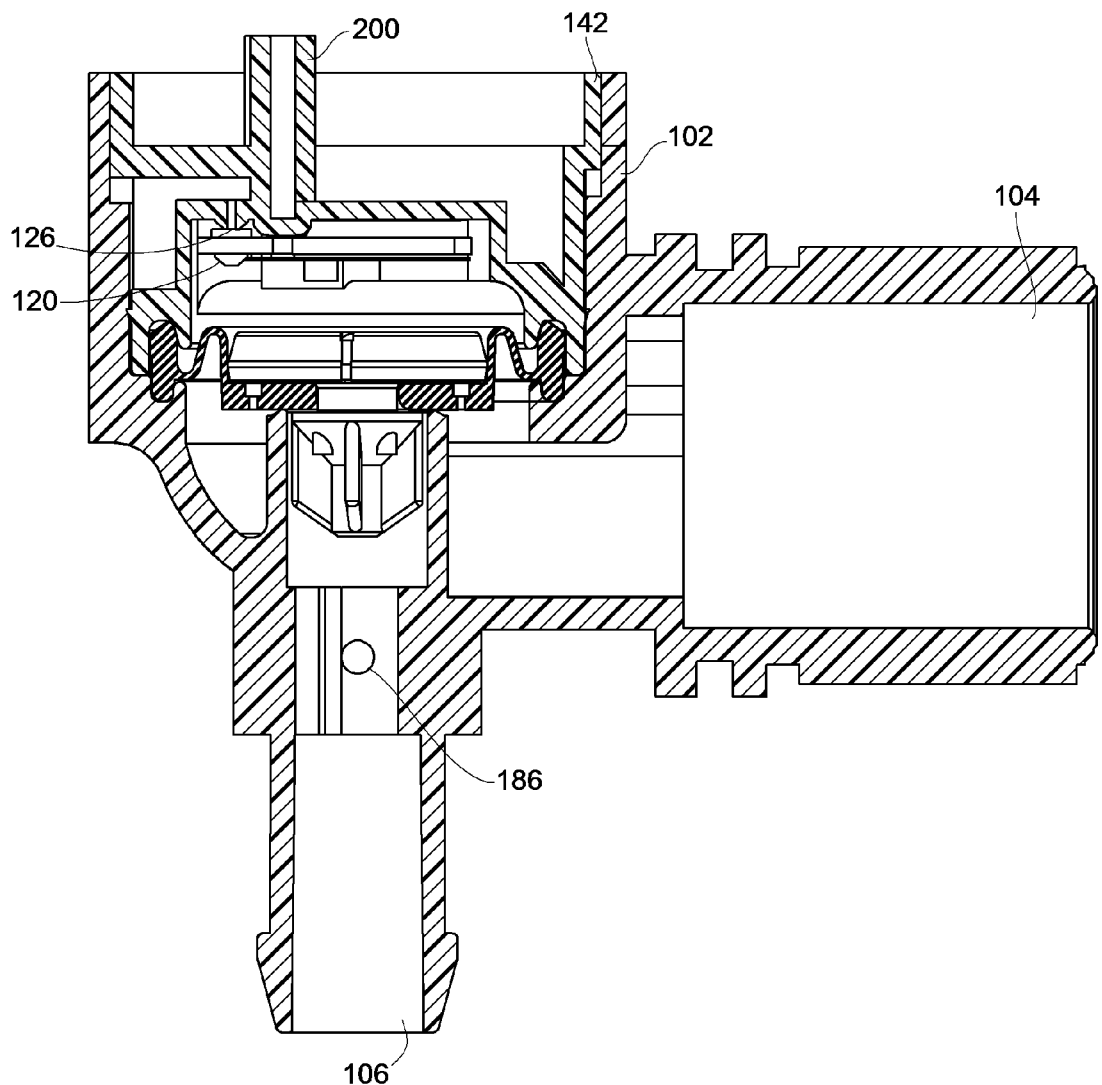
FIG. 27 is a partial cutaway illustration of an alternate embodiment of the CLP valve shown in FIG. 22 utilizing a frost plug configuration.

The embodiment illustrated in FIG. 27 utilizes a different configuration similar to that of a frost plug to form the coupling between the main valving chamber body 142 and the valve body 102. In this embodiment, the connecting surfaces are joined and sealed by ultrasonic welding, glue, or other appropriate method. The flow of fluid from the pilot valve opening 126 to the bypass chamber 130 is accomplished on an interior wall of the valve body 102.

Figure 28:
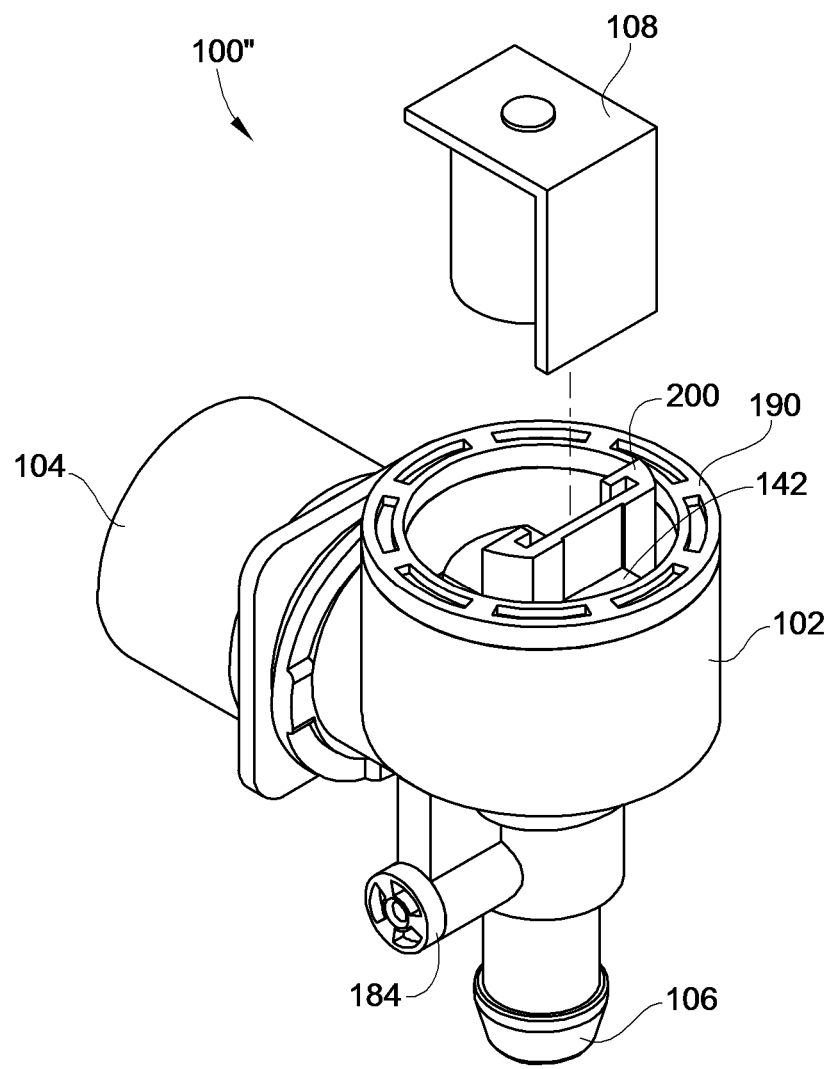
FIG. 28 is an exploded isometric view of the CLP valve of FIG. 22 illustrating a disassembly of the solenoid coil from the body of the CLP valve.

Advantageously, these configurations allow the main valving chamber body 142 and the coil assembly 108 to be positioned in any 360° orientation while still providing a bypass flow path between the main valving chamber 128 and the outlet 106. Regardless of the configuration, once the main valving chamber body 142 has been secured within the valve body 102, the solenoid assembly 108 may be inserted into a solenoid receiving slot 200 to complete construction of the CLP valve 100″ of the present invention as illustrated in FIG. 28.

Figure 29:
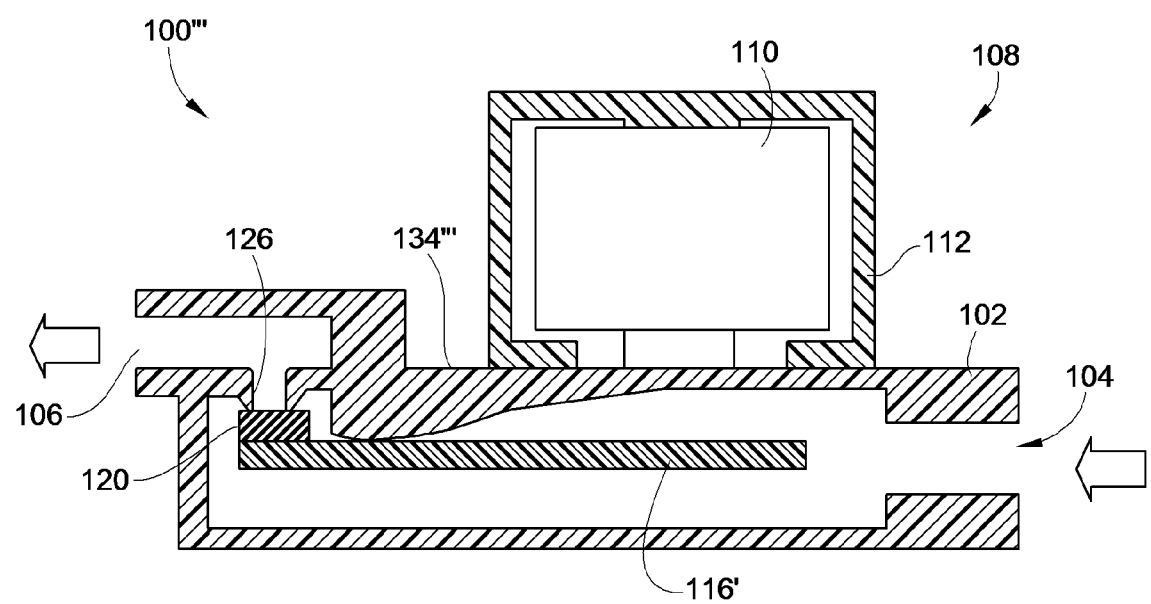
FIG. 29 is a simplified partial cutaway side view illustration of an alternative embodiment of the pilot valve actuation mechanism configured as a direct acting valve for use in an icemaker for a consumer appliance, e.g. coffee maker, refrigerator/freezer, etc.

As illustrated in FIG. 29, the means 114 of controlling the position of the pilot valving member 120 can be utilized in a CLP low flow valve 100′″ as a direct acting valve for low flow applications such as a coffee maker, an icemaker in a consumer refrigerator/freezer, etc. Such a configuration is illustrated in FIG. 29, and preferably utilizes the profiled fulcrum 134′″ to provide maximum advantage.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pilot operated water valve, comprising:
   a valve body having an inlet, an outlet, and a main valving chamber defined therebetween, the valve body further defining a bypass channel in fluid communication with the outlet;
   a main valving chamber body operably coupled to the valve body to enclose the main valving chamber, the main valving chamber body forming a pilot valve opening therein to provide fluid communication between the main valving chamber and the bypass channel;
   a main valving member positioned in the main valving chamber and operable to control a main flow of water from the inlet to the outlet, the main valving member having at least one bleed hole positioned therethrough;
   a pilot valving member positioned to control a bypass flow of water from the main valving chamber through pilot valve opening to the outlet to control a position of the main valving member;
   means for controlling the pilot valving member, the means utilizing a lever arm to provide inverse three multiplication to position the pilot valving member; and
   wherein the means comprises a solenoid assembly having a coil wound on a magnetic frame structure surrounding a guide tube formed by the main valving chamber body that is open on one end to the main valving chamber, a plunger moveably positioned within the guide tube and extending into the main valving chamber, the plunger coupled to a first end of the lever arm opposite the second end to which the pilot valving member is coupled, a spring operably coupled to the lever arm to apply a spring force thereto, and a fulcrum pivotably coupled to the lever arm at a position along a length of the lever arm closer to the second end thereof.

2. The pilot operated water valve of claim 1, wherein the spring provides the spring force on the plunger to extend the plunger into the main valving chamber in a quiescent state to thereby position the pilot valving member to prohibit a flow of water through the bypass channel.

3. The pilot operated water valve of claim 2, wherein the spring is a coil spring positioned in the guide tube at a closed end thereof to provide the spring force on a first end of the plunger within the guide tube.

4. The pilot operated water valve of claim 3, wherein the fulcrum comprises a shaft portion extending through an aperture in the lever arm and secured to the main valving chamber body, and a larger diameter portion at an end of the shaft portion on which the lever arm pivots.

5. The pilot operated water valve of claim 4, wherein the main valving chamber body includes a pair of lever arm guide shoulders positioned relative to the lever arm to guide pivoting thereof about the fulcrum.

6. The pilot operated water valve of claim 2, wherein the spring comprises a pair of spring arm members formed as part of the lever arm at the first end thereof, the pair of spring arm members providing the spring force on a second end of the plunger that extends out of the guide tube and into the main valving chamber.

7. The pilot operated water valve of claim 6, wherein the fulcrum comprises a pair of fulcrums positioned on either side of the lever arm, and wherein the lever arm includes a pair of fulcrum arms attached to the pair of fulcrums.

8. The pilot operated water valve of claim 2, wherein the coil is operable to pull the plunger into the guide tube when energized against the spring force applied by the spring to thereby position the pilot valving member to allow flow of water into the pilot valve opening and through the bypass channel.

9. A pilot operated water valve, comprising:
a valve body having an inlet, an outlet, and a main valving chamber defined therebetween, the valve body further defining a bypass channel in fluid communication with the outlet;
a main valving chamber body operably coupled to the valve body to enclose the main valving chamber, the main valving chamber body forming a pilot valve opening therein to provide fluid communication between the main valving chamber and the bypass channel;
a main valving chamber positioned in the main valving chamber and operable to control a main flow of water from the inlet to the outlet, the main valving member having at least one bleed hole positioned therethrough;
a pilot valving member positioned to control a bypass flow of water from the main valving chamber through pilot valve opening to the outlet to control a position of the main valving member;
means for controlling the pilot valving member, the means utilizing a lever arm to provide inverse force multiplication to position the pilot valving member; and
wherein the means comprises a solenoid assembly mounted on a wall of the main valving chamber body outside of and isolated from the main valving chamber, the solenoid assembly having a coil wound on a magnetic frame structure, a spring positioned within the main valving chamber and operably coupled to the lever arm positioned within the main valving chamber to apply a spring force thereto to position a first end of the lever arm opposite a second end to which the pilot valving member is coupled away from the wall on which the solenoid assembly is mounted in a quiescent state to thereby position the pilot valving member to prohibit a flow of water through pilot valve opening, and a fulcrum pivotably accommodating the lever arm at a position along a length of the lever arm closer to the second end thereof, wherein at least a portion of the lever arm near the first end is ferromagnetic, and wherein energization of the coil creates a magnetic field that causes the lever arm to pivot on the fulcrum so that the first end of the lever arm moves toward the wall to thereby position the pilot valving member away from the pilot valve opening to allow the flow of water through the bypass channel.

10. The pilot operated water valve of claim 9, wherein the lever arm includes a magnetic surface at the first end offset from the second end by an orientation portion, the orientation portion configured to position the second end at an acute angle away from the wall when the magnetic surface is parallel to the wall and to position the first end at an acute angle from the wall when the first end is parallel to the wall.

11. The pilot operated water valve of claim 9, wherein the fulcrum comprises a pair of fulcrums positioned on either side of the lever arm, and wherein the lever arm includes a pair of guide arms accommodated by the pair of fulcrums.

12. The pilot operated water valve of claim 11, wherein the spring comprises a generally planar spring member having a pair of outer spring arms coupled to the pair of fulcrums and a central spring arm extending between the pair of outer spring arms and applying a force on the second end of the lever arm.

13. The pilot operated water valve of claim 9, wherein the fulcrum is formed on the main valving chamber body.

14. The pilot operated water valve of claim 13, wherein the fulcrum is a profiled fulcrum to provide a changing pivot point for the lever arm as the lever arm is attracted by the magnetic field produced by the coil when energized.

15. The pilot operated water valve of claim 14, wherein the profiled fulcrum moves the pivot point along the lever arm away from the second end as the first end pivots toward the wall.

16. The pilot operated water valve of claim 15, wherein the profiled fulcrum and the lever arm provide greater leverage upon initial opening the pilot valving member to allow flow through the pilot valve opening and provide greater movement of the second end relative to the first end thereafter.

17. The pilot operated water valve of claim 13, wherein the fulcrum is a profiled fulcrum to provide a changing leverage opening ratio as the lever arm pivots about the profiled fulcrum.

18. The pilot operated water valve of claim 17, wherein the leverage opening ratio in a quiescent position is approximately 5 to 1.

19. The pilot operated water valve of claim 18, wherein the leverage opening ratio when the first end has pivoted to the wall is approximately 1.5 to 1.

20. The pilot operated water valve of claim 13, wherein the fulcrum is a stepped fulcrum to provide different, discrete pivot points for the lever arm as the lever arm is attracted by the magnetic field produced by the coil when energized to change the leverage opening ratio by discrete amounts.

21. The pilot operated water valve of claim 9, wherein the main valving chamber body defines a solenoid receiving slot on an external surface thereof configured to hold the solenoid assembly therein.

22. A pilot operated water valve, comprising:
a valve body having an inlet, an outlet, and a main valving chamber defined therebetween, the valve body further defining a bypass channel in fluid communication with the outlet;
a main valving chamber body operably coupled to the valve body to enclose the main valving chamber, the main valving chamber body forming a pilot valve opening therein to provide fluid communication between the main valving chamber and the bypass channel;
a main valving member positioned in the main valving chamber and operable to control a main flow of water from the inlet to the outlet, the main valving member having at least one bleed hole positioned therethrough;
a pilot valving member positioned to control a bypass flow of water from the main valving chamber through pilot valve opening to the outlet to control a position of the main valving member;
means for controlling the pilot valving member, the means utilizing a lever arm to provide inverse force multiplication to position the pilot valving member;
wherein the inlet is perpendicular to an axis of the outlet, and wherein the main valving chamber body is configured to form a channel between the valve body and an outer wall of the main valving chamber body to communicate fluid between the pilot valve opening and the bypass channel; and
wherein the bypass channel includes a first portion parallel to an axis of the outlet and a second portion perpendicular to the axis of the outlet in fluid communication with the first portion and the outlet, further comprising a bypass channel cap to isolate the bypass channel from an external environment.

23. A water valve for use in an appliance, comprising:
a valve body having an inlet, an outlet, and a main valving chamber defined therebetween;
a valving member positioned to control a flow of water from the main valving chamber to the outlet;
means for controlling the valving member, the means utilizing a lever arm to provide inverse force multiplication to position the valving member;
wherein the means comprises a solenoid assembly mounted on a wall of the valve body outside of and isolated from the main valving chamber, the solenoid assembly having a coil wound on a magnetic frame structure, a spring positioned within the main valving chamber and operably coupled to the lever arm positioned within the main valving chamber to apply a spring force thereto to position a first end of the lever arm opposite a second end to which the valving member is coupled away from the wall on which the solenoid assembly is mounted in a quiescent state to thereby position the valving member to prohibit a flow of water to the outlet, and a fulcrum pivotably accommodating the lever arm at a position along a length of the lever arm closer to the second end thereof, wherein at least a portion of the lever arm near the first end is ferromagnetic;
wherein energization of the coil creates a magnetic field that causes the lever arm to pivot on the fulcrum so that the first end of the lever arm moves toward the wall to thereby position the valving member to allow the flow of water through the valve body; and
wherein the fulcrum is a profiled fulcrum to provide a changing pivot point for the lever arm as the lever arm is attracted by the magnetic field produced by the coil when energized, and wherein the profiled fulcrum moves the pivot point along the lever arm away from the second end as the first end pivots toward the wall.

24. A pilot operated water valve, comprising:
a valve body having an inlet, an outlet, and a main valving chamber defined therebetween, the valve body further defining a bypass channel in fluid communication with the outlet;
a main valving chamber body operably coupled to the valve body to enclose the main valving chamber, the main valving chamber body forming a pilot valve opening therein to provide fluid communication between the main valving chamber and the bypass channel;
a main valving member positioned in the main valving chamber and operable to control a main flow of water from the inlet to the outlet;
a pilot valving member positioned to control a bypass flow of water from the main valving chamber through pilot valve opening to the outlet to control a position of the main valving member;
a lever arm having a first end and a second end, at least a portion of the first end being ferromagnetic, the second end being coupled to the pilot valving member;
a fulcrum pivotably accommodating the lever arm at a position along a length of the lever arm closer to the second end thereof; and
a solenoid assembly mounted on a wall of the valve body outside of and isolated from the main valving chamber, the solenoid assembly having a coil wound on a magnetic frame structure;
a spring positioned within the main valving chamber and operably coupled to the lever arm positioned within the main valving chamber to apply a spring force to the lever arm to position the first end away from the wall on which the solenoid assembly is mounted in a quiescent state to thereby position the pilot valving member to prohibit a flow of water through pilot valve opening; and
wherein energization of the coil creates a magnetic field that causes the lever arm to pivot on the fulcrum so that the first end of the lever arm moves toward the wall to thereby position the pilot valving member away from the pilot valve opening to allow the flow of water through the bypass channel to open the main valving member.

25. The pilot operated water valve of claim 24, wherein the lever arm includes a magnetic surface at the first end offset from the second end by an orientation portion, the orientation portion configured to position the second end at an acute angle away from the wall when the magnetic surface is parallel to the wall and to position the first end at an acute angle from the wall when the first end is parallel to the wall.

26. The pilot operated water valve of claim 24, wherein the fulcrum comprises a pair of fulcrums positioned on either side of the lever arm, and wherein the lever arm includes a pair of guide arms accommodated by the pair of fulcrums.

27. The pilot operated water valve of claim 26, wherein the spring comprises a generally planar spring member having a pair of outer spring arms coupled to the pair of fulcrums and a central spring arm extending between the pair of outer spring arms and applying a force on the second end of the lever arm.

28. The pilot operated water valve of claim 24, wherein the fulcrum is a profiled fulcrum to provide a changing pivot point for the lever arm as the lever arm is attracted by the magnetic field produced by the coil when energized to provide a changing leverage opening ratio as the lever arm pivots about the profiled fulcrum such that the leverage opening ratio in a quiescent position is approximately 5 to 1 and the leverage opening ratio when the first end has pivoted to the wall is approximately 1.5 to 1.

29. The pilot operated water valve of claim 24, wherein the fulcrum is a stepped fulcrum to provide different, discrete pivot points for the lever arm as the lever arm is attracted by the magnetic field produced by the coil when energized to change the leverage opening ratio by discrete amounts.

30. The pilot operated water valve of claim 24, wherein the inlet is perpendicular to an axis of the outlet, and wherein the main valving chamber body is configured to form a channel between the valve body and an outer wall of the main valving chamber body to communicate fluid between the pilot valve opening and the bypass channel.

31. The pilot operated water valve of claim 24, wherein the inlet is perpendicular to an axis of the outlet, and wherein the main valving chamber body is configured to form a channel between the valve body and an outer wall of the main valving chamber body to communicate fluid between the pilot valve opening and the bypass channel, the channel being isolated from an external environment by a spin ring coupled to the valve body and to the main valving chamber body.

32. The pilot operated water valve of claim 24, wherein the main valving chamber body defines a solenoid receiving slot on an external surface thereof configured to hold the solenoid assembly therein.

* * * * *